United States Patent

Sato

(10) Patent No.: US 10,025,655 B2
(45) Date of Patent: Jul. 17, 2018

(54) STORAGE SYSTEM

(71) Applicant: Hitachi, Ltd., Tokyo (JP)

(72) Inventor: Takahito Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 15/120,888

(22) PCT Filed: Jun. 26, 2014

(86) PCT No.: PCT/JP2014/066989
§ 371 (c)(1),
(2) Date: Aug. 23, 2016

(87) PCT Pub. No.: WO2015/198449
PCT Pub. Date: Dec. 30, 2015

(65) Prior Publication Data
US 2016/0371136 A1    Dec. 22, 2016

(51) Int. Cl.
| G06F 11/00 | (2006.01) |
| G06F 11/07 | (2006.01) |
| G06F 11/20 | (2006.01) |
| G06F 11/14 | (2006.01) |
| G06F 12/00 | (2006.01) |
| G06F 13/10 | (2006.01) |

(52) U.S. Cl.
CPC ........ G06F 11/079 (2013.01); G06F 11/0727 (2013.01); G06F 11/0751 (2013.01);
(Continued)

(58) Field of Classification Search
CPC ............. G06F 11/2097; G06F 11/2028; G06F 11/1446; G06F 11/2082; G06F 11/2058;
(Continued)

(56) References Cited

U.S. PATENT DOCUMENTS

| 6,907,543 B2 * | 6/2005 | Hino | G06F 11/2033 714/4.4 |
| 7,805,632 B1 * | 9/2010 | Luke | G06F 11/1471 714/36 |
| 8,156,369 B2 * | 4/2012 | Maki | G06F 11/201 714/43 |
| 8,275,958 B2 * | 9/2012 | Kaiya | G06F 3/0617 711/162 |
| 8,595,549 B2 | 11/2013 | Ninose | |

(Continued)

FOREIGN PATENT DOCUMENTS

| JP | 2008-225753 A | 9/2008 |
| JP | 2009-266120 A | 11/2009 |

(Continued)

OTHER PUBLICATIONS

International Search Report of PCT/JP2014/066989 dated Sep. 9, 2014.

*Primary Examiner* — Charles Ehne
(74) *Attorney, Agent, or Firm* — Mattingly & Malur, PC

(57) ABSTRACT

A storage system is composed of a first storage subsystem and a second storage subsystem each having one or more volumes, and a third storage subsystem capable of being accessed from both the first storage subsystem and the second storage subsystem. The storage system operates to replicate the data written from the host to a volume within the first or the second storage subsystem to a volume within the second or the first storage subsystem. The first and second storage subsystems periodically write health check information to the third storage subsystem. When the first storage subsystem receives a write request from the host but cannot replicate the write data to the second storage subsystem, it reads the health check information written to the third storage subsystem to confirm that a volume of the second storage subsystem is I/O prohibited, and resumes processing regarding the write request from the host.

12 Claims, 24 Drawing Sheets

(52) U.S. Cl.
CPC ...... *G06F 11/0787* (2013.01); *G06F 11/1446* (2013.01); *G06F 11/2028* (2013.01); *G06F 11/2058* (2013.01); *G06F 11/2082* (2013.01); *G06F 11/2097* (2013.01); *G06F 12/00* (2013.01); *G06F 13/10* (2013.01)

(58) Field of Classification Search
CPC ............. G06F 11/2092; G06F 11/2094; G06F 11/2076; G06F 11/2089
See application file for complete search history.

(56) References Cited

U.S. PATENT DOCUMENTS

| | | | | |
|---|---|---|---|---|
| 2004/0024979 | A1* | 2/2004 | Kaminsky | G06F 11/2069 711/162 |
| 2006/0123212 | A1* | 6/2006 | Yagawa | G06F 11/2058 711/162 |
| 2006/0259815 | A1* | 11/2006 | Graham | G06F 11/1662 714/11 |
| 2008/0104443 | A1* | 5/2008 | Akutsu | G06F 11/2058 714/6.12 |
| 2008/0201602 | A1* | 8/2008 | Agarwal | G06F 11/2097 714/4.1 |
| 2008/0229039 | A1 | 9/2008 | Maki et al. | |
| 2009/0271582 | A1 | 10/2009 | Ninose | |
| 2009/0287967 | A1* | 11/2009 | Winokur | G06F 11/1443 714/54 |
| 2010/0169454 | A1 | 7/2010 | Tanimura et al. | |
| 2011/0066801 | A1 | 3/2011 | Sato | |
| 2011/0145631 | A1* | 6/2011 | Shankar | G06F 11/0709 714/4.11 |
| 2011/0179231 | A1 | 7/2011 | Roush | |
| 2013/0042082 | A1 | 2/2013 | Tamura et al. | |
| 2013/0086349 | A1 | 4/2013 | Kaiya et al. | |
| 2015/0067387 | A1* | 3/2015 | Liao | G06F 11/2094 714/6.3 |

FOREIGN PATENT DOCUMENTS

| | | |
|---|---|---|
| JP | 2010-170542 A | 8/2010 |
| JP | 2012-504793 A | 2/2012 |
| JP | 2013-041353 A | 2/2013 |

* cited by examiner

Fig. 5

| Pair# | Pair Status | PDKC# | P-VOL# | SDKC# | S-VOL# | Change-Ongoing Flag |
|---|---|---|---|---|---|---|
| 1 | 1 | 1 | 1 | 12 | 0 | 0 |
| 2 | 1 | 1 | 2 | 12 | 1 | 0 |
| 3 | 0 | 1 | 3 | 12 | 3 | 0 |
| 4 | 0 | 1 | 0 | 12 | 2 | 0 |
| ⋮ | ⋮ | | ⋮ | | | |
| | ⋮ | | ⋮ | | | |
| | | | | | | |

T301 T302 T303 T304 T305 T306 T307

T300

Pair Status
0: Initial-copy
1: Duplex
2: Suspend
3: Duplex-pending

| LDEV# | Status |
|---|---|
| 1 | 0 |
| 2 | 0 |
| 3 | 1 |
| 4 | 1 |
| 5 | 1 |
| 6 | 0 |
| : | |

T400 mode:
0=valid
1=invalid

STORAGE SYSTEM

TECHNICAL FIELD

The present invention relates to a technique for enhancing the availability of storage systems.

BACKGROUND ART

Currently, in many storage subsystems, a technique for enhancing reliability, for example, such as a RAID (Redundant Arrays of Independent (or Inexpensive) Disks) technique, is adopted to provide reliability that exceeds the reliability of a single HDD. However, along with the recent advancement of the information-oriented society, there are cases where the reliability provided by the RAID technique is not sufficient.

One example for improving the availability of the subsystem and coping with such situation, as disclosed in Patent Literature 1, constitutes an information system using multiple (such as two) storage subsystems (hereinafter referred to as subsystem A and subsystem B), wherein data is duplicated in subsystem A and subsystem B. According to the information system disclosed in Patent Literature 1, the volume is subjected to duplex writing to subsystem A and subsystem B, wherein the host is configured to access the volume of subsystem A at normal times. When the host fails to access (process the I/O of) the volume of subsystem A, the access destination is switched so as to access the volume of subsystem B, to thereby enable operation to be continued.

One of the conditions required in such duplex configuration system is to prevent the host from accessing erroneous data. Patent Literature 1 discloses an example of a case where the volume duplication (copy) between subsystems A and B has failed due to the disconnection of the link between subsystems A and B. As a considerable case, the host performs operation using the volume of subsystem A for a while, and when failure occurs in the subsystem A, the host A switches to access the subsystem B. At this point of time, however, since the volume in subsystem B only stores data that is older than the volume in subsystem A, it is preferable to perform control so as not to receive accesses from the host.

According to the information system taught in Patent Literature 1, this problem is solved by providing and using a failure detecting volume that can be accessed from both subsystems A and B. When subsystem A fails to perform the volume duplicating process, subsystem A reads the contents of the failure detecting volume to check whether a failure information flag has been written thereto by subsystem B or not. When a failure information flag has not been written, subsystem A writes the failure detection flag therein, and thereafter, resumes the process related to the access request from the host.

Furthermore, when failure occurs to subsystem A, the host switches the access destination from subsystem A to subsystem B. Then, subsystem B reads the contents of the failure detecting volume, and checks whether a failure information flag has been written by subsystem A. In this case, since the failure information flag is written, subsystem B returns a response to the host notifying that the I/O had failed. This arrangement enables the host to be prevented from reading old data.

CITATION LIST

Patent Literature

[PTL 1] Specification of U.S. Pat. No. 8,595,549

SUMMARY OF INVENTION

Technical Problem

The system configuration as taught in Patent Literature 1 is so-called Active/Standby configuration. In a system adopting the Active/Standby configuration, one of the subsystems (such as subsystem B) is a standby-based subsystem. In such configuration, the host normally accesses the volumes of subsystem A.

On the other hand, the purpose of the system for duplicating volumes can be load distribution and the like, in addition to the above-described purpose of continuing operation during failure. In a system where volumes are duplicated in subsystems A and B, as described above, if the host can be operated to issue access requests alternately to subsystems A and B, load can be distributed among subsystems A and B, and the access performance can be improved. The configuration enabling such operation is called Active/Active configuration.

In this case, even when the host accesses the volume of subsystem B, it is required that the duplicated state of the volumes in subsystem A and the volumes in subsystem B is continued. The system adopting Active/Standby configuration as taught in Patent Literature 1 is configured assuming that the subsystem B is only accessed from the host when the host is incapable of accessing subsystem A. Therefore, when the host accesses the volumes in subsystem B, even when there is no failure in the system, the volumes in subsystem A and the volumes in subsystem B will not be able to maintain the duplicated state (the data duplication process is stopped), so that the technique taught in Patent Literature 1 cannot be used for the purpose of load distribution.

Solution to Problem

The storage system according to a preferred embodiment of the present invention is composed of a first storage subsystem and a second storage subsystem each having one or more volumes, and a third storage subsystem capable of being accessed by the first storage subsystem and the second storage subsystem. The storage system is operated so that the data written to the volume in the first or the second storage subsystem from the host is replicated to the volume in the second or the first storage subsystem.

Further, the first and second storage subsystems periodically write health check information to the third storage subsystem. When the first storage subsystem receives a write request from the host but fails to replicate the write data to the second storage subsystem, it determines whether the volume of the second storage subsystem is in I/O prohibited state or not based on the contents of the health check information written in the third storage subsystem, and after determining that the second storage subsystem is in I/O prohibited state, it resumes the process related to the write request.

Advantageous Effects of Invention

The storage system according to the present invention can realize operation of Active/Active configuration, and can take appropriate measures when failure occurs.

BRIEF DESCRIPTION OF DRAWINGS

FIG. 5 is a view illustrating the contents of a pair management table.

FIG. 6 is a view illustrating the contents of an LDEV status information.

DESCRIPTION OF EMBODIMENTS

Now, a storage system according to one preferred embodiment of the present invention will be described with reference to the drawings. However, the present invention is not restricted to the preferred embodiments described below.

Embodiment 1

(1) System Configuration

Figure 1:
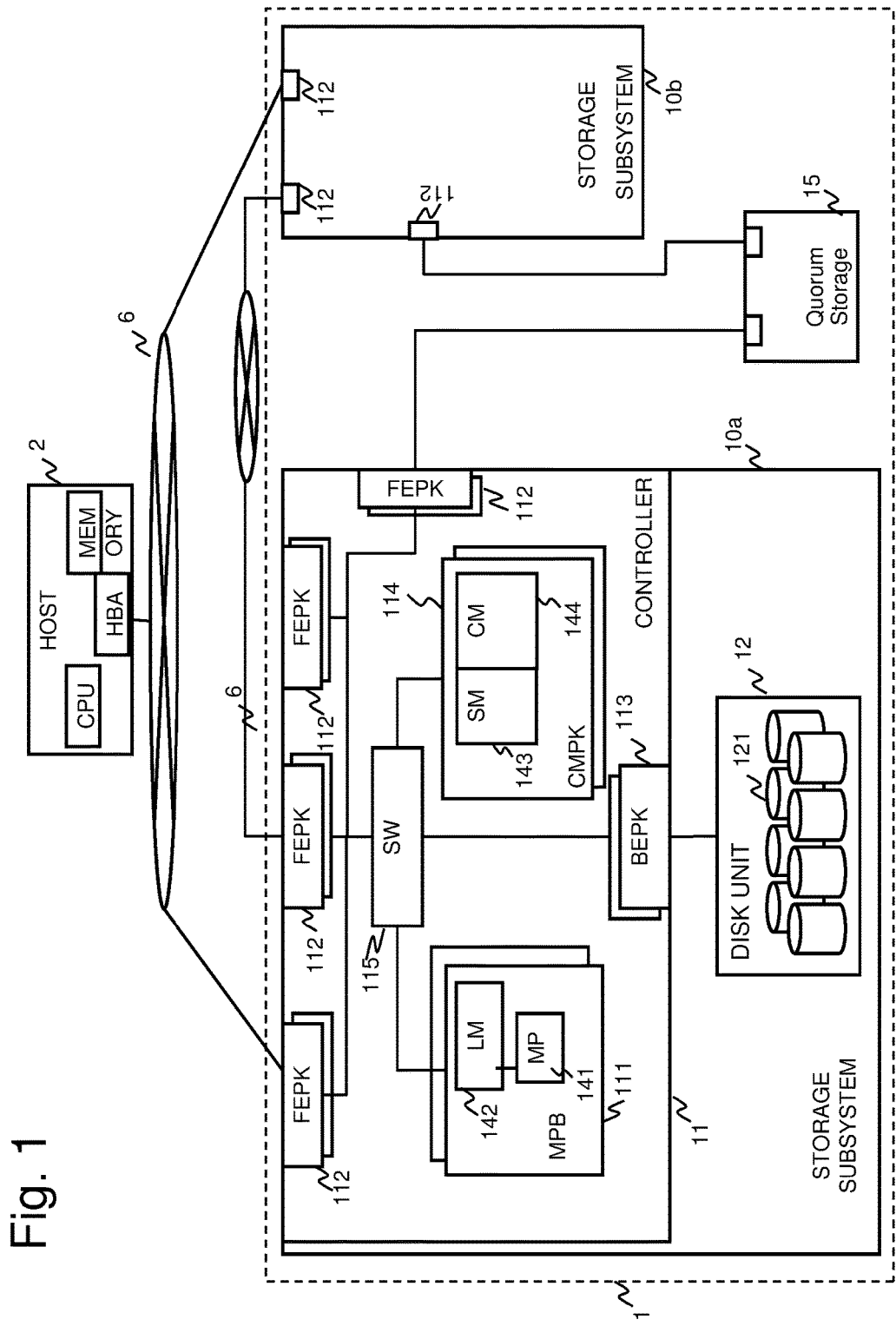
FIG. 1 is a configuration diagram of a computer system according to a preferred embodiment of the present invention.

FIG. 1 illustrates a configuration example of a computer system according to one preferred embodiment of the present invention. A computer system is composed of a storage system 1 and a host 2. The storage system 1 is composed of a storage subsystem 10a, a storage subsystem 10b, and a Quorum Storage 15.

The storage subsystem 10a is connected to the host 2 and the storage subsystem 10b via a SAN 6. The SAN 6 is a network configured, for example, by using transmission lines (cables) and switches in compliance with Fibre Channel standards. Similarly, the storage subsystem 10b is also connected to the host 2 and the storage subsystem 10a via the SAN 6. Further, in order to distinguish the path connecting the host 2 and the storage subsystem 10 from the path mutually connecting the storage subsystems 10 (the storage subsystem 10a and the storage subsystem 10b), in the following description, the path mutually connecting the storage subsystems 10 is called an "inter-storage-subsystem path" or an "inter-DKC path".

The storage subsystem 10a is composed of a storage controller (sometimes abbreviated as "controller") 11 and a disk unit 12 having multiple drives 121. The storage controller 11 adopts a configuration in which an MPB 111 which is a processor board executing control such as I/O processing performed in the storage subsystem 10a, a frontend package (FEPK) 112 which is a data transfer interface with the host 2 or the storage subsystem 10b, a backend package (BEPK) 113 which is a data transfer interface with the disk unit 12, and a memory package (CMPK) 114 having a memory for storing cache data and control information are mutually connected via a switch (SW) 115. The number of the respective components (MPB 111, FEPK 112, BEPK 113 and CMPK 114) is not restricted to the number illustrated in FIG. 1, but in order to ensure high availability, normally, multiple numbers of respective components exist. It is also possible to increase the number of these components later.

Each MPB 111 is a package board having a processor (also referred to as MP) 141, and a local memory (LM) 142 storing the data used by the relevant processor 141. In FIG. 1, an example is shown where only one MP 141 is installed in the MPB 111, but the number of MPs 141 is not restricted to one. Further, the storage subsystem 10a has a clock (not shown), and the MP 141 is capable of acquiring the current time information from the clock. The clock can be built into the MP 141.

The CMPK 114 has an SM 143 and a CM 144. The CM 144 is an area used as a so-called disk cache for temporarily storing write data from the host 2 or the data read from the drive 121. The SM 143 is an area for storing control information and the like used by the MPB 111. The information stored in the SM 143 can be accessed from all MPs 141 of all MPBs 111. The CMPK 114 should preferably have a means such as battery backup so as to prevent data loss when power stoppage or other failure occurs.

The FEPK 112 is a package board for performing data transmission and reception with other devices (such as the host 2 or the storage subsystem 10b), and has one or more interfaces for connecting to the SAN 6. Fibre Channel interface is used as an example of the interface. In FIG. 1, the storage subsystem 10a and the storage subsystem 10b are illustrated as being connected via a single transmission line, but actually, the storage subsystem 10a and the storage subsystem 10b are connected via multiple transmission lines. Further, the number of transmission lines between the host 2 and the storage subsystems 10 is not restricted to the configuration illustrated in FIG. 1. It is possible to have multiple transmission lines disposed between the host 2 and the storage subsystems 10.

The BEPK 113 is a package board for performing data transmission and reception with the drive 121, and has one or more interfaces for connecting with the disk unit 12. SAS (Serial Attached SCSI) is used as an example of the interface.

The disk unit 12 has multiple drives 121, wherein each drive 121 mainly stores write data from the host 2. For example, magnetic disk such as HDD is used as the drive 121, but storage media other than HDD, such as SSD (Solid State Drive), can also be used.

The storage subsystem 10b is an apparatus having similar components as the storage subsystem 10a (the internal configuration is not shown in FIG. 1). However, the number of each component (such as the MPB 111, the FEPK 112, the drive 121 and so on) is not necessarily the same as that of the storage subsystem 10a. Hereafter, when describing the functions and the like that both the storage subsystem 10a and the storage subsystem 10b have in common, the storage subsystem 10a and the storage subsystem 10b will not be distinguished, and will be commonly referred to as "the storage subsystem 10".

The Quorum Storage 15 is connected to the storage subsystems 10a and the storage subsystem 10b. The Quorum Storage 15 will be described in detail later.

The host 2 is a computer having, at least, a processor, a memory, and an HBA (Host Bus Adapter) which is an interface for connecting with the SAN 6. The processor executes programs stored in a memory 302. In the host 2, an application program such as a database management system (DBMS) and the like is executed, to access the data stored in the storage subsystem 10.

(2) Operation Outline

Next, we will describe the outline of the processing performed in the storage system 1 for processing I/O requests from the host 2. At first, we will describe the volumes provided to the host 2 from the storage subsystems 10. Each storage subsystem 10 forms one or more logical volumes (called volumes or LDEVs) using the storage area of drives 121 existing within its own disk unit 12. Also, the storage subsystem 10 assigns a unique identification number (logical volume number or LDEV #) to each logical volume for management. These logical volumes are provided to the host 2. The method for forming logical volumes and the method for providing the formed logical volume to the host 2 is the same as that performed in conventional storage subsystems.

Figure 2:
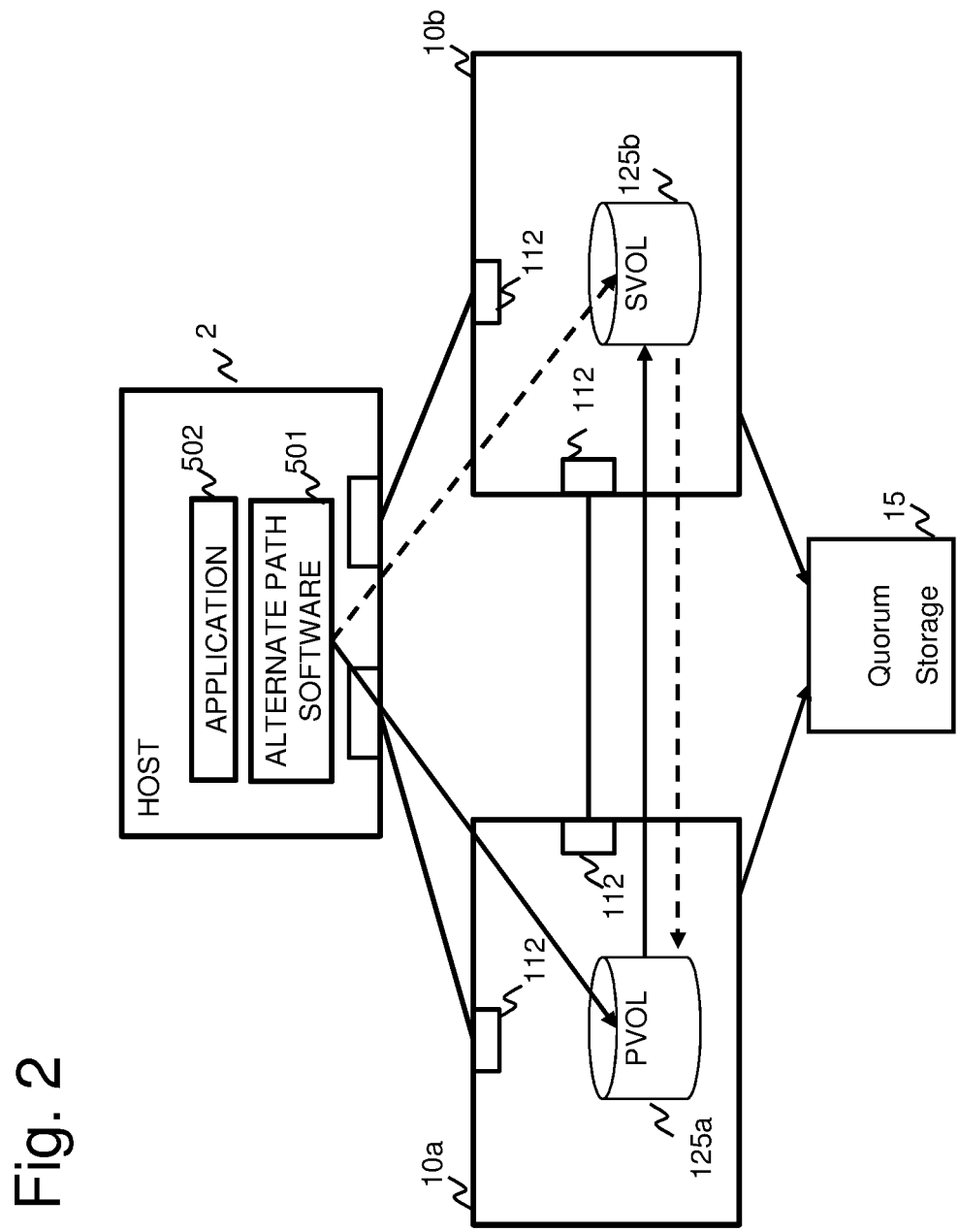
FIG. 2 is a view illustrating an outline of a process when a storage subsystem receives a data write request from a host.

In principle, in the storage system 1 according to the preferred embodiment, the write data from the host 2 is written into both the logical volume of the storage subsystem 10a and the logical volume of the storage subsystem 10b (so that a so-called data duplication is performed). With reference to FIG. 2, the outline of data duplication performed in the storage system 1 will be described.

Data duplication is executed by the storage subsystem 10. The solid lines in FIG. 2 show the flow of write data when the storage subsystem 10a receives a write request and a write data from the host 2. For example, when the storage subsystem 10a receives a write request and a write data regarding a logical volume 125a from the host 2, the storage subsystem 10a stores the write data in its own logical volume 125a. At the same time, the storage subsystem 10a transmits a replica of the write data and an instruction (write request) to write the replica of the write data to the logical volume 125b to the storage subsystem 10b, to have the storage subsystem 10b store the replica of the write data in a logical volume 125b.

In the computer system according to the preferred embodiment of the present invention, data duplication is also performed when the host 2 issues a write request to the storage subsystem 10b. The dotted line of FIG. 2 shows the flow of the write data when the storage subsystem 10b receives the write request and the write data from the host 2.

That is, when the storage subsystem 10b receives the write request and the write data from the host 2, the write data is stored in both logical volumes 125b and 125a.

As described, in the computer system according to the preferred embodiment of the present invention, both the logical volumes 125b and 125a are in a state where the same data is stored in both volumes (which is called a synchronized state) unless data duplication cannot be performed due to reasons such as failure occurring in the storage system 1. Therefore, the host 2 can access (read or write) either the logical volume 125a or the logical volume 125b.

The order of write of the data to the two logical volumes (logical volume 125a and logical volume 125b) is determined based on a kind of attribute information set for the logical volume. The logical volume to which data is written first is called primary volume (sometimes referred to as P-VOL), and the logical volume to which data is written second is called secondary volume (sometimes referred to as S-VOL). FIG. 2 illustrates an example where the logical volume 125a is set as the P-VOL and the logical volume 125b is set as the S-VOL.

Incidentally, the fact that the logical volume 125a and the logical volume 125b are in different storage subsystems 10 each other is not recognized, at least by the application 502 of the host 2. The computer system according to the preferred embodiment of the present invention makes the volume identifiers of the logical volume 125a and the logical volume 125b the same, so that an alternate path software 501 of the host 2 will recognize that the logical volumes 125a and 125b are the same volume.

In the configuration of FIG. 2, the alternate path software 501 is operated in the host 2. When multiple access paths from the host 2 to the logical volumes (called "paths") exist, the alternate path software 501 has a function to recognize the paths and to select the path to be used out of the multiple paths when accessing the logical volume. In order to recognize the paths, the alternate path software 501 issues a command for acquiring identification information of volumes, such as an INQUIRY command defined by SCSI standards, to the logical volumes recognized by the host 2, so as to acquire volume identifiers.

The system is configured so that when the storage subsystem 10a receives an INQUIRY command to the logical volume 125a, or when the storage subsystem 10b receives an INQUIRY command to the logical volume 125b, the same volume identifier is returned to a command transmission source (the host 2). Therefore, the alternate path software 501 recognizes the logical volume 125a and the logical volume 125b as an identical volume. As a result, it is recognized that the path from the host 2 to the logical volume 125b (the dotted line arrow from the host 2 to the logical volume 125b in the drawing; hereinafter, this path is called "path 2") is the alternate path of the path from the host 2 to the logical volume 125a (the solid line arrow from the host 2 to the logical volume 125a in the drawing; hereinafter, this path is called "path 1"). If path 1 is disconnected due to failure, or if path 1 is busy, for example, when the alternate path software 501 receives an access request from the application program 502 or the like to the logical volume 125, the alternate path software 501 issues an access request through path 2 (that is, issues an access request to the logical volume 125b). Even if the alternate path software 501 issues an access request to the logical volume 125b, since the same data is stored in the logical volume 125b and the logical volume 125a, no problem will occur during operation.

(3) Quorum Disk

Next, we will describe the relationship between the storage subsystem 10 and the Quorum Storage 15. The Quorum Storage 15 is a storage device having at least one volume. Further, the storage subsystem 10 has a function to access (read or write) volumes that the storage device has, when a storage device such as the Quorum Storage 15 is connected to the interface of the FEPK 112. Hereafter, in the present embodiment, it is assumed that the Quorum Storage 15 has one volume. This volume is called "Quorum Disk".

The storage subsystem 10a periodically writes information into the Quorum Disk. The details of the information will be described later, but the information written here is a kind of health check information, which includes information showing that the storage subsystem 10a is active (not stopped by causes such as failure). Moreover, it includes information of the result of communication, such as communication failure, with other storage subsystems 10 (such as the storage subsystem 10b). Then, the storage subsystem 10b reads information periodically from the Quorum Disk to check the status of the storage subsystem 10a. Similarly, the storage subsystem 10b writes information to the Quorum Disk periodically. The storage subsystem 10a reads this written information periodically to determine the status of the storage subsystem 10b.

In the above description, the configuration where the Quorum Storage 15 is connected to the interface of the FEPK 112 of the storage subsystem 10 has been described, but the configuration of the storage system 1 is not restricted to this configuration. The connection should simply be performed so that both the storage subsystems 10a and 10b are accessible to the Quorum Disk. For example, as an embodiment different from the one described above, it can be configured so that the Quorum Storage 15 is connected via the BEPK 113 of the storage subsystem 10.

The hardware configuration of the Quorum Storage 15 can be the same hardware configuration as the storage subsystem 10, or can be a different hardware configuration. Moreover, FIG. 1 illustrates a configuration where the storage subsystem 10a (or the storage subsystem 10b) and the Quorum Storage 15 are connected via a single transmission line, but a configuration can also be adopted where multiple transmission lines exist between the storage subsystem 10a (or the storage subsystem 10b) and the Quorum Storage 15.

Figure 3:
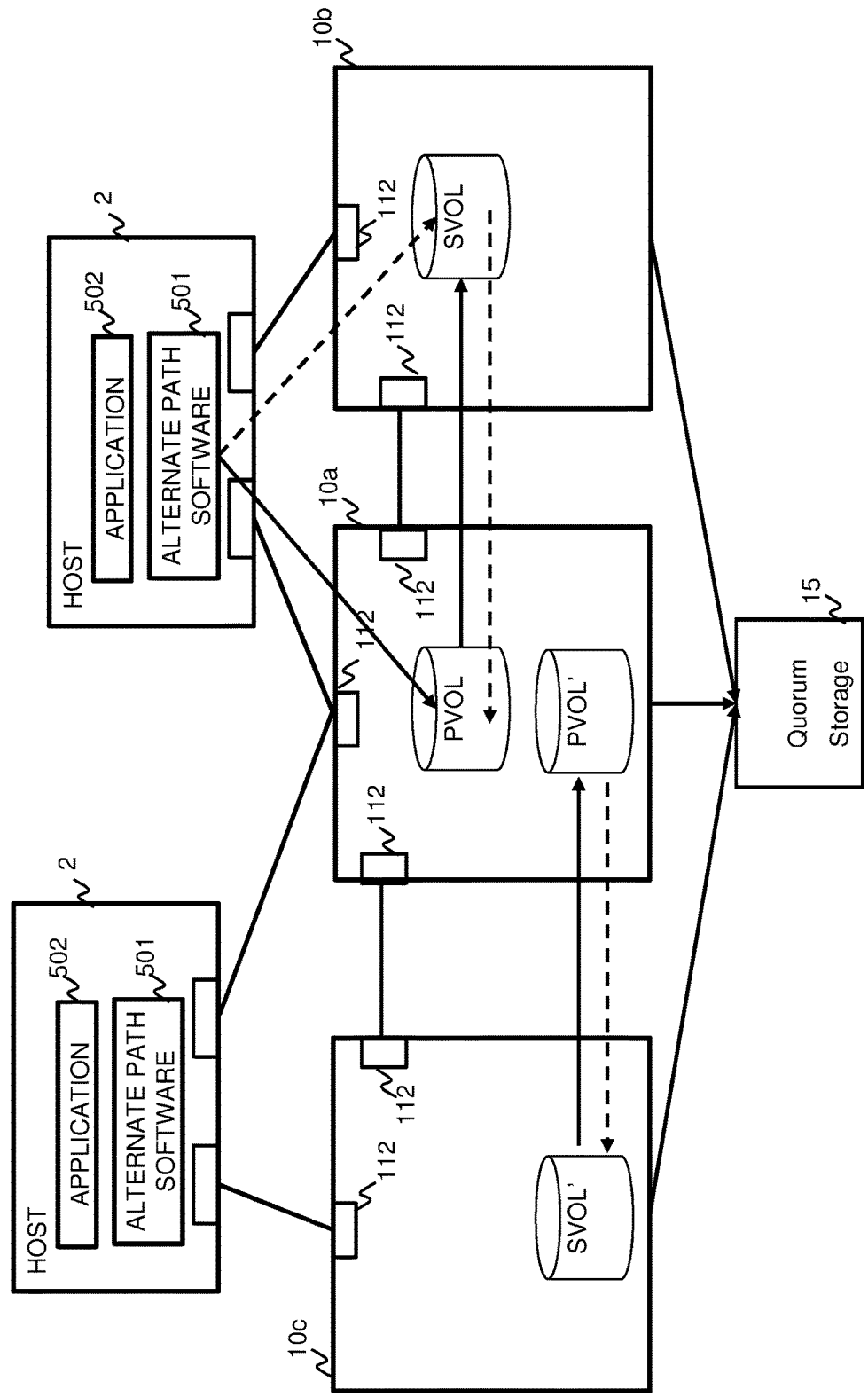
FIG. 3 is another configuration example of a storage system.

In the following description, a configuration is mainly illustrated where there are two storage subsystems 10 (storage subsystems 10a and 10b) connected to the Quorum Storage 15, but it is possible to adopt a configuration where more than two storage subsystems 10 are connected to the Quorum Storage 15. For example, as shown in FIG. 3, it is possible to adopt the configuration where the storage subsystems 10a, 10b and 10c are connected to the Quorum Storage 15.

(4) The Structure of Management Information

Figure 4:
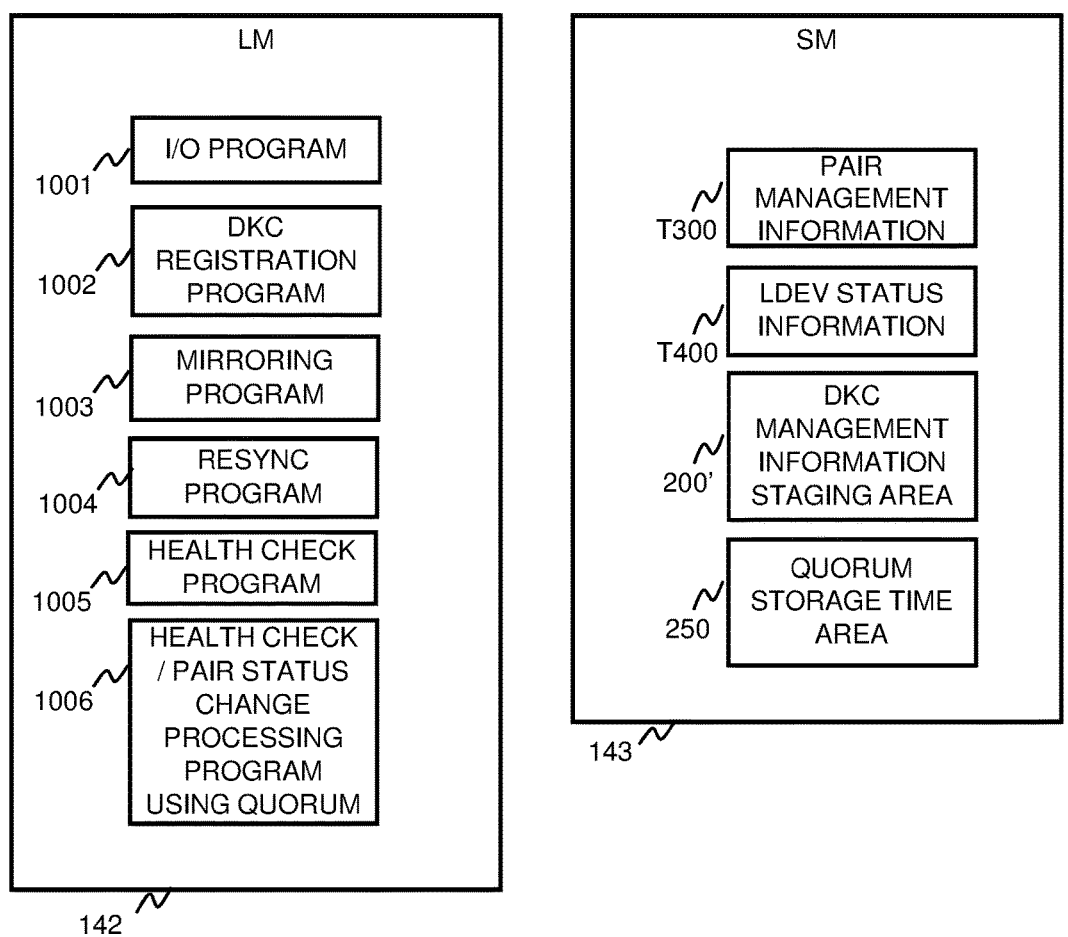
FIG. 4 is a view illustrating programs and management information stored in a memory of the storage subsystem.

Next, we will describe the contents of management information that the storage subsystem 10 has with reference to FIGS. 4 through 6. The storage subsystem 10 according to the present embodiment at least stores management information named pair management information T300 and LDEV Status information T400 in the SM 143. Further, DKC management information staging area 200' and Quorum storage time area 250 are allocated in the SM 143. DKC management information (described later) stored in the Quorum Disk is temporarily stored (staged) in the DKC management information staging area 200'. The time at which the MP 141 has updated the DKC management information in the Quorum Disk is stored in the Quorum storage time area 250. In the present embodiment, an example is illustrated where these information are stored in the SM 143, and that the MP 141 accesses the SM 143 to refer to and update the information, but with the aim to improve the access performance, it is possible to copy (cache) a portion of the information stored in the SM 143 to the LM 142, and to have the MP 141 access the information cached in the LM 142.

We will now describe the pair management information T300. As mentioned earlier, in principle in the storage system 1, the write data from the host 2 is stored in two logical volumes. For example, if the storage subsystem 10a receives a write request and a write data to be written to the logical volume 125a from the host 2, the write data is stored in the logical volume 125a of the storage subsystem 10a and the logical volume 125b of the storage subsystem 10b.

FIG. 5 illustrates a structure of a pair management table T300. Information of one volume pair is stored in each row of the pair management table T300. In the present specification, a pair composed of a P-VOL and an S-VOL to which the replica of the relevant P-VOL is written is called "volume pair". Further, the S-VOL storing the replica of a certain P-VOL is called "volume in pair relationship with the P-VOL" or "pair volume of the P-VOL". In contrast, the P-VOL which is a logical volume storing the copy source data of a certain S-VOL is called "volume in pair relationship with the S-VOL" or "pair volume of the S-VOL". In the storage subsystem 10, an identifier called pair number (Pair #) is assigned to each pair for management, and the pair number is stored in Pair # (T301). Information on the P-VOL belonging to the volume pair (PDKC # which is a serial number of the storage subsystem to which the P-VOL belongs, and the LDEV# of the P-VOL) is stored in PDKC # (T303) and P-VOL # (T304). Further, information on the S-VOL belonging to the volume pair (SDKC # which is an identification number capable of specifying the storage subsystem to which the S-VOL belongs, and the LDEV# of the S-VOL) is stored in SDKC # (T305) and S-VOL # (T306).

The status of a volume pair (pair status) is stored in Pair Status (T302). The pair status will be described in detail later. As for change-ongoing flag (T307), 1 (ON) is set when there is a need to change the pair status, and 0 (OFF) is set in other cases. The actual way of use thereof will be described later.

We will now describe the pair status. Each volume pair takes any one of the states described below. These states are called "pair status" in the present specification.
(a) Initial-Copy State:
 The storage system 1 initially performs a process to copy all the contents of P-VOL to the S-VOL (called initial copy processing) when creating a volume pair. The state in which this processing is on-going is called "Initial-Copy state".
(b) Duplex State:
 The state of a volume pair where the contents of the P-VOL and the contents of the S-VOL have become identical via the initial copy processing or a resynchronization processing described later is called "Duplex state".
(c) Suspend State:
 The state where the contents of the P-VOL are not mirrored in the S-VOL is called "Suspend state". For example, if the transmission line connecting the storage subsystem 10a and the storage subsystem 10b is cut off and copying becomes impossible, the volume pair gets into the "Suspend state". It is also possible that the volume pair enters the "Suspend state" based on the instruction from a user. The processing for setting a volume pair to "Suspend state" is called Suspend processing.

(d) Duplex-Pending State:

When a volume pair is in a transitional state of transiting from the Suspend state to the Duplex state, the status of the volume pair is called "Duplex-Pending state". In this state, regarding the volume pair which was in Suspend state, the data in the P-VOL (or the S-VOL) is copied to the S-VOL (or the P-VOL) in order to coincide (synchronize) the contents of the P-VOL and the S-VOL. At the point of time when the copy is completed, the status of the volume pair becomes "Duplex state". The processing for transiting the volume pair in "Suspend state" to the Duplex state is called resynchronization processing (resync processing).

One of the four states described above is stored in Pair Status (T302) of the pair management table T300. When 0 is stored in Pair Status (T302), it means that the status of the volume pair is "Initial-Copy state", and when 1 is stored therein, it means that the status of the volume pair is "Duplex state". Moreover, when 2 is stored in Pair Status (T302), it means that the status of the volume pair is "Suspend state", and when 3 is stored therein, it means that the status of the volume pair is "Duplex-Pending state".

In the above description, it has been described that the "Initial-Copy state" and the "Duplex-Pending state" are different states. However, when the volume pair is in "Initial-Copy state" or "Duplex-Pending state", they correspond in that both the contents of P-VOL and S-VOL are synchronizing. Therefore, it is not necessary to manage the two states differently, and they can be managed as a single state.

Next, we will describe the volume pair in Suspend state in further detail. The reason why a volume pair is changed to the Suspend state is not restricted to a single cause. For example, as mentioned earlier, a case may be possible where the transmission line connecting the storage subsystem 10a and the storage subsystem 10b is cut off, but other than that, possible cases include a case where failure occurs to the storage subsystem 10a or the logical volume 125a so that the logical volume 125a cannot be accessed, or a case where failure occurs to the storage subsystem 10b or the logical volume 125b so that the logical volume 125b cannot be accessed.

For example, in case failure occurs in the storage subsystem 10a but the storage subsystem 10b is in a normal state, the logical volume 125b should be accessible from the host 2. In contrast, if failure occurs in the storage subsystem 10b but the storage subsystem 10a is in a normal state, the logical volume 125a should be accessible from the host 2. Therefore, it is necessary for the storage subsystem 10 to manage information related to the accessibility of each logical volume. The LDEV Status information T400 is used for managing the accessibility of each logical volume.

FIG. 6 illustrates one example of the LDEV Status information T400. The status of the logical volume specified by the LDEV # (T401) is stored in Status (T402). In the present specification, when the logical volume is in accessible state from the host 2, the status of the logical volume is called "Valid state". In contrast, in case the logical volume is not accessible from the host 2 (such as when failure occurs to the logical volume), the status of the logical volume is called "Invalid state" or "blocked state".

Status (T402) can take the state of either 0 or 1. In case of 0, it means that the status of the logical volume is "Valid state", and in case of 1, it means that the status of the logical volume is "Invalid state". If the pair status of a volume pair is in "Duplex state", the status of both of the P-VOL and the S-VOL belonging to the volume pair is "Valid state".

The LDEV Status information T400 is information that each storage subsystem 10 has. One LDEV Status information T400 stores only information related to the logical volume included in the storage subsystem 10 to which the relevant LDEV Status information T400 is stored (for example, only the status of the logical volume included in the storage subsystem 10b is stored in the LDEV Status information T400 included in the storage subsystem 10b).

Figure 7:
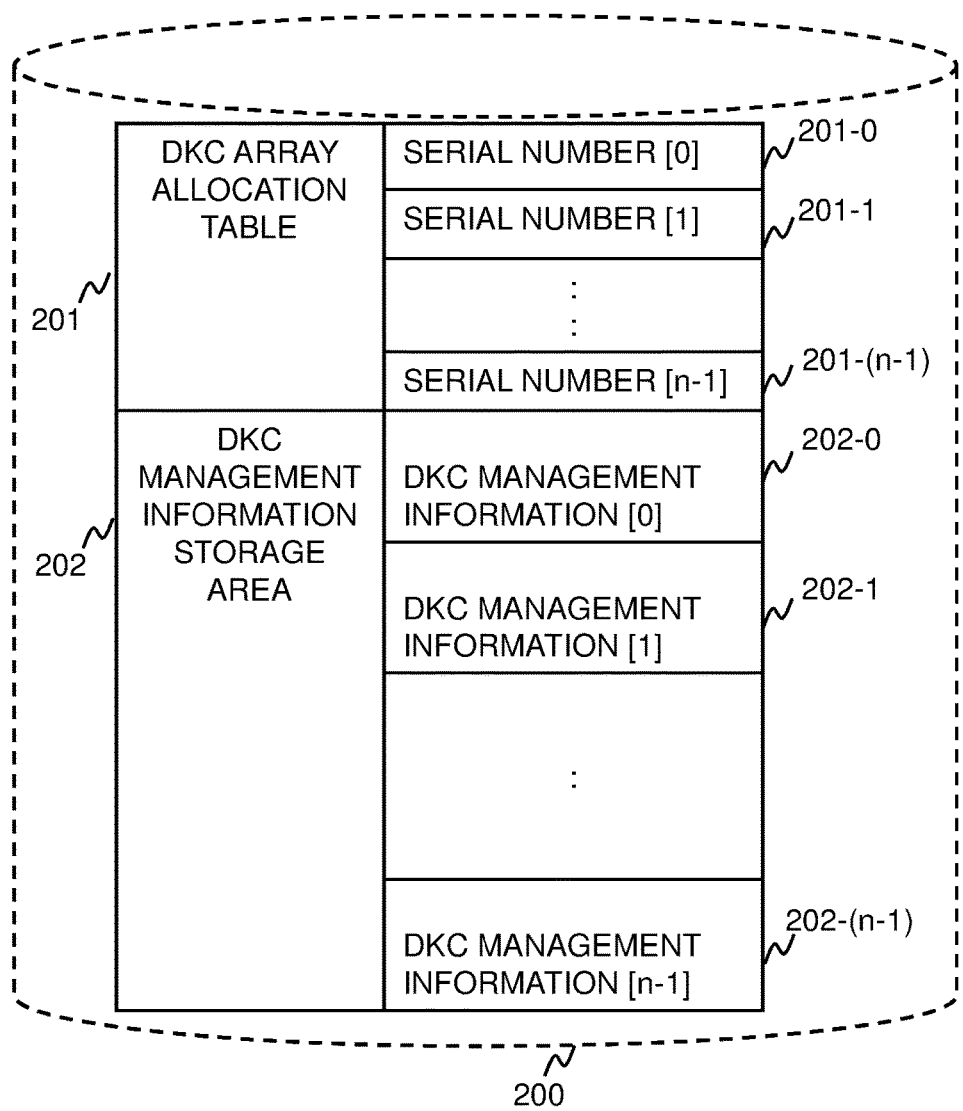
FIG. 7 is a view illustrating the information stored in a Quorum Disk.
Figure 8:
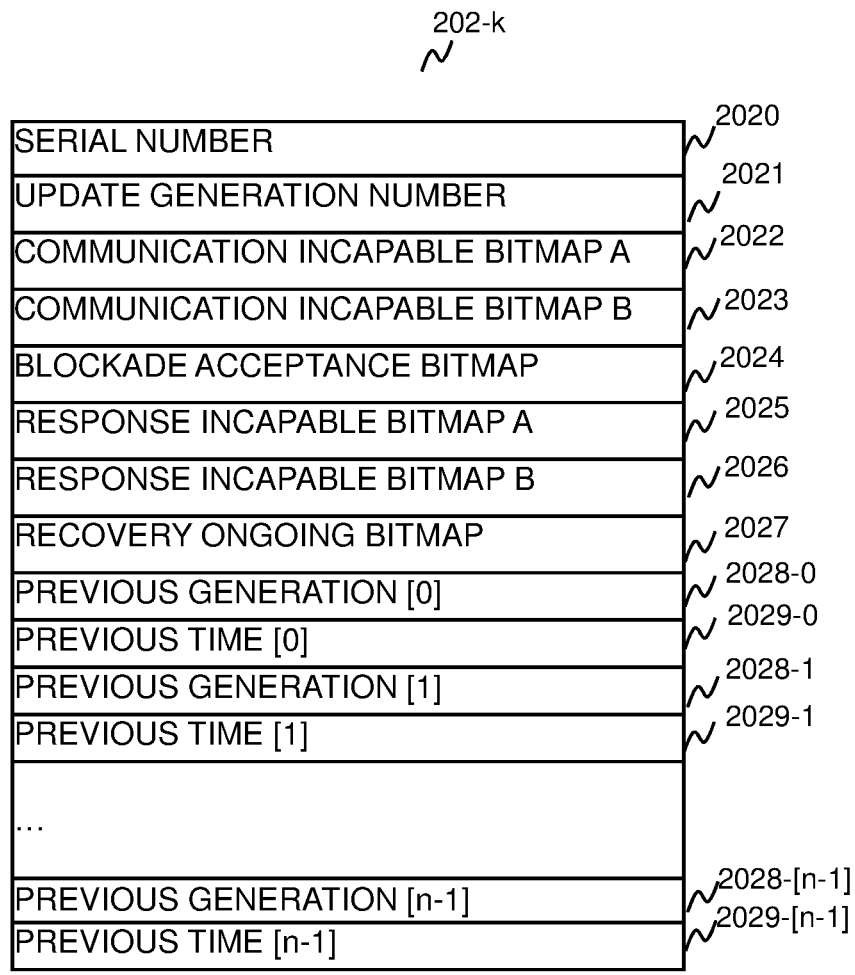
FIG. 8 is a view illustrating the contents of information stored in the DKC management information.

Next, with reference to FIGS. 7 and 8, we will describe the contents of the information stored in the Quorum Disk. As mentioned earlier, the storage subsystem 10 periodically stores information in the Quorum Disk. Further, the storage subsystem 10 periodically refers to the information stored in the Quorum Disk.

The Quorum Storage 15 can have a maximum of n (n is a fixed value determined in advance and an integer value of two or greater: one example of which is n=16) storage subsystems 10 connected thereto. Each of the storage subsystems 10 connected to the Quorum Storage 15 is controlled to write information to a given area within the Quorum Disk. Therefore, the same number of management information storage areas as the maximum number (n) of the storage subsystems 10 connected to the Quorum Storage 15 are allocated in the Quorum Disk.

The management information storage area will be described with reference to FIG. 7. The Quorum Disk has an area called a DKC array allocation table 201, and a DKC management information storage area 202. The location in which these areas are allocated is determined in advance (for example, the initial portion of the area is located at the initial position (address 0) of the volume). In the initial state, no data is written to the areas (for example, 0 is written in all areas). Of these areas, the DKC management information storage area 202 is the area where the respective storage subsystems 10 periodically store information.

As shown in FIG. 7, the DKC management information storage area 202 is divided into n partial areas of DKC management information [0] (202-0), DKC management information [1] (202-0) through DKC management information [n−1] (202-(n−1). When each storage subsystem 10 periodically writes information, it writes information into one of the DKC management information [0] (202-0) through DKC management information [n−1] (202-(n−1)).

The area into which each storage subsystem 10 writes information is determined by having a process called "registration processing to Quorum Disk". This process is executed, for example, when one or multiple storage subsystems 10 have been introduced to the storage system 1, by the user instructing the storage subsystem 10 having been introduced to perform the registration processing to Quorum Disk through use of a management terminal or the like. Then, the MP 141 of the storage subsystem 10 having received the instruction executes a DKC registration program 1002 stored in the LM 142. When the DKC registration program 1002 is executed, the MP 141 determines the area into which the storage subsystem 10 writes information based on the contents of the information stored in the DKC array allocation table 201 of the Quorum Disk.

Hereafter, the actual contents of the determination method will be described. As shown in FIG. 4, the DKC array allocation table 201 has areas of serial number [0] (201-0) through serial number [n−1] (201-(n−1) allocated thereto, as shown in FIG. 4. Each time the registration processing to the Quorum Disk is performed by the storage subsystem 10 connected to the Quorum Storage 15, the storage subsystem 10 stores a serial number to the area closest to the initial area out of the areas where the content is 0 out of the areas of serial number [0] (201-0) through serial number [n−1] (201-(n−1)). For example, when non-zero value is already stored in the areas of serial number [0] through serial number [(k−1)] (k being an integer value satisfying 1≤k<n), the storage subsystem 10 executing the registration processing to Quorum Disk stores the serial number in the serial number [k] (201-k). Then, the storage subsystem 10 is determined to use the DKC management information [k] (202-k) (to update the content of the DKC management information [k] (202-k)) when writing in information.

Since the registration processing to the Quorum Disk is performed via the above method, the storage subsystem 10 having executed the (k+1)-th registration processing to the Quorum Disk is determined to write information to the DKC management information [k]. Hereafter, the storage subsystem 10 writing information to the DKC management information [k] (202-k) (in other words, the storage subsystem 10 having stored the serial number in the serial number [k] (201-k)) is referred to as "DKC #k". Further, the value k is sometimes referred to as "array number" (or "array #").

Further, the DKC #k refers to all the information in the DKC management information [0] (202-0) through DKC management information [n−1] (202-[n−1]). However, when the DKC #k stores information in the Quorum Disk, it only updates the DKC management information [k] (202-k). That is, since the respective storage subsystems 10 do not write data into the same area, it is not always necessary to perform exclusive control when the respective storage subsystems 10 read or write the Quorum Disk.

Further, in FIG. 7, each of the DKC management information [k] is placed sequentially in the Quorum Disk, but not necessarily all the DKC management information [k] are placed sequentially. Any placement method can be employed as long as the read/write target address can be uniquely specified when the storage subsystem 10 reads the DKC management information [k] from the Quorum Disk or writes it into the Quorum Disk. For example, it is possible to have the start of each DKC management information [k] positioned at the start of a block (such as 512 bytes) which is a minimum access unit of a volume.

Next, the contents of the information stored in the DKC management information [k] will be described with reference to FIG. 8. In the DKC management information [k], at least the following information is stored, as shown in FIG. 8: a serial number (2020), a generation number (2021), a communication incapable bitmap A (2022), a communication incapable bitmap B (2023), a blockade acceptance bitmap (2024), a response incapable bitmap A (2025), a response incapable bitmap B (2026), a recovery ongoing bitmap (2027), a previous generation [0] (2028-0) to previous generation [n−1] (2028-[n−1]), and a previous time [0] (2029-0) to previous time [n−1] (2029-[n−1]).

A serial number of DKC #k is stored in the serial number (2020). Therefore, a same value as the value stored in the serial number [k] (201-k) of the DKC array allocation table 201 is stored in the serial number (2020).

A value corresponding to the number of times the DKC #k has stored information in the DKC management information [k] is stored in the update generation number (2021). The details will be described later, but during operation of the storage subsystem 10, the DKC #k repeatedly executes information storage to the DKC management information [k]. Then, every time the DKC #k stores information to the DKC management information [k], it adds 1 to the value stored in the update generation number (2021) (for example, when m is stored in the update generation number (2021) in the current storage processing, (m+1) will be stored in the update generation number (2021) at the time of the next storage processing).

The communication incapable bitmap A (2022) is an n-bit information, and each bit shows whether it is capable of communicating via a path (inter-DKC path) between the DKC #k and the other storage subsystems 10. When it is detected that DKC #k is in a state unable to communicate with DKC #j (j is an integer value satisfying 0≤j≤(n−1) and in the relationship of j≠k) via the path existing between DKC #k and DKC #j (for example, when data transfer from DKC #k to DKC #j fails), the DKC #k stores 1 in the information of the j-th bit in the communication incapable bitmap A (2022) (in contrast, if it is not detected that communication using the path between DKC #i and DKC #j is incapable, 0 is stored in that bit). The details will be described later.

In the following, the state where "1" is stored in a certain bit in the bitmap is described that the bit is "ON", and the state where "0" is stored in a certain bit is described that the bit is "OFF". As described above, since the relationship of j≠k is satisfied, the k-th bit of the bits in the communication incapable bitmap A (2022) of the DKC management information [k] are not used.

Similar to the communication incapable bitmap A (2022), the communication incapable bitmap B (2023) is also an n-bit information related to the state of the path between the DKC #k and other storage subsystems 10. When the DKC #k detects the fact that "DKC #j has detected the state that the communication using the path between DKC #j and DKC #k is incapable", DKC #k stores 1 in the j-th bit information of the communication incapable bitmap B (2023). The details will be described later.

The blockade acceptance bitmap (2024) is also an n-bit information. When DKC #k detects the fact that "DKC #j has detected the state that the communication using the path between DKC #j and DKC #k is incapable", and when it is determined that the volumes in the DKC #k in pair relationship with the DKC #j at that time should be set to invalid state, DKC #k stores 1 in the j-th bit information of the communication incapable bitmap B (2023). In the present embodiment, setting the status of the volume to invalid state is sometimes called "blocked".

The response incapable bitmap A (2025) is also an n-bit information, wherein each bit shows whether a health check processing performing writing of information to the Quorum Disk is in an impossible state or not since the storage subsystem 10 is stopped due to causes such as failure. When DKC #k detects the fact that DKC #j has not perform writing of information to the Quorum disk for a predetermined time or longer, and when 1 is stored in the j-th bit information of the communication incapable bitmap A (2022) of DKC #k, DKC #k stores 1 in the j-th bit information of the response incapable bitmap A (2025). In this state, since the storage subsystem 10 is in a stopped state, it is in a state not capable of receiving the I/O request from the host 2 to the logical volume.

The response incapable bitmap B (2026) is also an n-bit information similar to the response incapable bitmap A (2025), and information of the time when the storage subsystem 10 other than DKC #k detects the state of DKC #k is stored. When the DKC #k detects the fact that "DKC #j has detected that DKC #k had not performed writing of information to the Quorum disk for a predetermined time or longer", DKC #k stores 1 in the j-th bit information of the response incapable bitmap B (2026). The details will be described later.

The recovery ongoing bitmap (2027) is information showing that the resync processing is on-going. When the DKC #k is in a state performing resync processing between the DKC #j, the DKC #k stores 1 in the j-th bit information of the recovery ongoing bitmap (2027).

Previous generation [0] (2028-0) through previous generation [n−1] (2028-[n−1]) and previous time [0] (2029-0) through previous time [n−1] (2029-[n−1]) are used when the DKC #k refers to the information of the update generation number (2021) stored in the DKC management information [j] (where j≠k). The DKC #k is supposed to update only the DKC management information [k] (202-k) when updating the contents of the DKC management information storage area 202. However, the DKC #k is capable of referring to all the information of the DKC management information [0] (202-0) through the DKC management information [n−1] (202-[n−1]). By referring to the DKC management information [0] (202-0) through the DKC management information [n−1] (202-[−1]), the DKC #k determines whether the other storage subsystems 10 are operating normally or not. When the DKC #k refers to the update generation number (2021) of the DKC management information [j] (where j≠k), that information is stored in the previous generation [j] of the DKC management information [k].

The time when the DKC #k has referred to the update generation number (2021) of the DKC management information [j] is stored in the previous time [j] of the DKC management information [k]. The details will be described later.

(5) Process Flow

Next, the flow of the process executed in the storage system 1 will be described. The process described below is performed by the MP 141 of the storage subsystem 10 executing a program stored in the LM 142. The program executed by the MP 141 of the storage subsystem 10 will be described with reference to FIG. 4.

FIG. 4 illustrates a program stored in the LM 142. An I/O program 1001, a DKC registration program 1002, a mirroring program 1003, a resync program 1004, a health check program 1005, and a the health check/pair status change processing program 1006 using a Quorum exist in the LM 142.

The I/O program 1001 is a program executed when the storage subsystem 10 receives an access request from the host 2 to the logical volume. As described earlier, the DKC registration program 1002 is a program executed during a registration processing to the Quorum Disk. The registration processing to the Quorum Disk has already been described, so it will not be described here.

The mirroring program 1003 is a program executed when performing data duplication (writing of data to the P-VOL and the S-VOL). For example, the program is called by the I/O program 1001 and executed when the data written to the P-VOL is also written to the S-VOL.

The resync program 1004 is a program executed when the volume pair in Suspend state is changed to a Duplex state. Further, the resync program 1004 is started when an instruction from a user is received.

The health check program 1005 is a program for performing the health check processing described later. The health check program 1005 refers to the information stored in the Quorum Disk to determine the states of the respective storage subsystems 10, and performs a process to write the determined results to the Quorum Disk.

The health check/pair status change processing program 1006 using Quorum is executed in such a state as being called by the respective programs described above. Hereafter, the process performed by executing the health check/pair status change processing program 1006 using Quorum is called a "health check/pair state change processing using Quorum".

When the respective programs call the health check/pair status change processing program 1006 using Quorum (hereafter, the program for calling the health check/pair status change processing program 1006 using Quorum is called a "call source program"), the call source program passes at least the following two parameters to the health check/pair status change processing program 1006 using Quorum.

The first parameter is called a "processing type". There are three processing types, which are "failure Suspend", "resync" and "health check", and the call source program designates one of these three processing types as the first parameter.

The second parameter is a serial number of the process target storage subsystem. However, the second parameter may not be designated. In that case, the call source program passes "0" as the second parameter to the health check/pair status change processing program 1006 using Quorum. The details of the processes executed by the health check/pair status change processing program 1006 using Quorum will be described later.

Next, the flow of the process performed by the MP 141 executing the I/O program when the storage subsystem 10 receives a write request, from the host 2 to the P-VOL will be described with reference to FIGS. 9 and 10.

When the storage subsystem 10 receives a write request related to a logical volume from the host 2, the write request (write command) issued from the host 2 to the storage subsystem 10 includes information for specifying the access target logical volume, such as the logical unit number (LUN) and the like. When the MP 141 receives the write request from the host 2, it specifies the access target logical volume based on the information for specifying the access target logical volume included in the write request. Thereafter, it refers to the pair management information T300 to determine whether the access target logical volume is P-VOL or S-VOL.

The flow of the process when it has been determined that the access target logical volume is P-VOL will be described with reference to FIG. 9. The MP 141 confirms the pair status of the access target logical volume by referring to the pair management information T300 (S1). When the pair status is not Duplex, Initial Copy or Duplex Pending (S1: N), the data will not be duplexed (data is only written to the P-VOL). Therefore, the MP 141 only executes a process to write data to the P-VOL (S9), and ends the process. In S9, the MP 141 confirms the status of the logical volume by referring to the LDEV Status information T400. When the status of the logical volume is an invalid state, an error is returned to the host 2 and the process is ended.

In the determination of S1, when the pair status is any one of Duplex, Initial Copy or Duplex Pending (S1: Y), the processes of S2 and thereafter are performed. In S2, the MP 141 executes a data write processing to the P-VOL.

In S3, the MP 141 issues a write request to the storage subsystem 10 in which the S-VOL in pair relationship with the P-VOL exists (hereafter, this subsystem is referred to as a counterpart storage subsystem), and receives a response information of the result of the processing from the counterpart storage subsystem. In the counterpart storage subsystem, a write processing to the S-VOL is executed based on the received write request, and at the point of time when the write processing is completed, a response notifying that the process has been completed ("succeeded" if the process has succeeded) to the issue source storage subsystem of the write request.

When the processing result in the counterpart storage subsystem is "succeeded" (S4: Y), it responds that the write processing has been completed to the host 2 (S5), and ends the process. If the processing results in the counterpart storage subsystem is not "succeeded" (S4:N; this includes the following cases, for example; a case where the counterpart storage subsystem is stopped and the processing result is not returned from the counterpart storage subsystem within a given period, or a case where the inter-DKC path has been cut off and the write request could not be transmitted to the counterpart storage subsystem), the processes of S10 and thereafter are executed.

In S10, the MP 141 sets the change-ongoing flag (T307) to 1 for all the volume pairs in pair relationship with the counterpart storage subsystem in the pair management table T300.

In S11, the MP 141 calls the health check/pair status change processing program 1006 using Quorum to execute the failure suspend processing. At this time, the MP 141 passes the following two information, which are the processing type and the serial number of the target storage subsystem, to the health check/pair status change processing program 1006 using Quorum. In S11, the MP 141 designates "failure Suspend" as the processing type, and the serial number of the counterpart storage subsystem as the serial number of the target storage subsystem. The details of the process will be described later.

In S12, the MP 141 refers to the status of the volume pair in the storage subsystem 10. In S12, as a result of referring to the status of the volume pair, it is determined whether the status change of all volume pairs have been completed (S13). Specifically, it refers to the pair management table T300, and if the change-ongoing flag (T307) is all 0, it determines that the status change of all volume pairs has been completed.

As a result of the determination in S13, if the status change of all volume pairs is completed (S13: end), a response is returned to the host (S5) and the process is ended. If the statuses of all volume pairs have not yet been changed (S13: process ongoing), the process waits for a given period of time (S14), and the process of S11 is executed again.

The flow of the process described above is an example of a case where, in principle, the status of the volume pair is either a Duplex state or a Suspend state, which are types of a steady state. The process is somewhat different in a case where the pair status is in a transitional state, as in an Initial Copy state or a Duplex Pending state.

In S3, when the pair status is either the Initial Copy or the Duplex Pending state, data copy between the P-VOL and the S-VOL (hereinafter referred to as background copy) is performed in parallel. If the area set as the write target by the write request is already copied by the background copying process, the same process as process (S3) described above (issuing a write request to a counterpart storage subsystem) will be performed, but if the write target area is not already copied by the background copying process, the process of S3 will not be performed, but a notice notifying that the process has been successfully performed is returned to the host, and the process of FIG. 9 is ended. This is because the write target area will eventually be copied to the S-VOL by the background copying process.

Further, when the pair status is either the Initial Copy or the Duplex Pending state, as a result of issuing a write request to the counterpart storage subsystem in S3, if the processing result in the counterpart storage subsystem is not "succeeded" (S4: N), the pair status (Pair Status (T302)) of the access target volume (volume pair) is set to "Suspend" state, and the status of the P-VOL (Status (T402)) is set to "Valid" state, and the process is ended. This is because in the Initial Copy state or the Duplex Pending state, not all the contents of the P-VOL are mirrored in the S-VOL, and the data of the S-VOL is not effective data.

On the other hand, the flow of the process when the access target logical volume is determined to be the S-VOL will be described with reference to FIG. 9. The MP 141 confirms the pair status of the access target logical volume by referring to the pair management information T300 (S1). If the pair status is not a Duplex state (S1: N), the data will not be duplexed (data is only written to the S-VOL), so that only the process for writing data to the S-VOL is executed (S9'), and the process is ended. Further, in S9', the MP 141 confirms the status of the logical volume by referring to the LDEV Status information T400. If the state of the logical volume is an invalid state, the process returns an error to the host 2 and ends the process. If the pair status is either the Initial Copy state or the Duplex Pending state, the status of the S-VOL (Status (T402)) is Invalid state (data identical to the P-VOL is not stored, that is, effective data is not stored), so that an error is returned to the host 2 and the process is ended.

If the pair status is a Duplex state in the determination of S1 (S1: Y), the processes of S3' and thereafter are performed. In S3', the MP 141 issues a write request to the storage subsystem 10 in which the P-VOL in pair relationship with the S-VOL exists (hereafter, this subsystem is called a counterpart storage subsystem), and receives a response information of the process result from the counterpart storage subsystem.

If the process result in the counterpart storage subsystem is "succeeded" (S4: Y), the MP 141 executes a data write processing to the S-VOL (S2'), responds that the write processing has ended to the host 2 (S5), and ends the process. If the process result in the counterpart storage subsystem is not "succeeded" (S4: N), the processes of S11 and thereafter will be performed. S11 through S14 are similar to the steps described with reference to FIG. 9.

As described with reference to FIGS. 9 and 10, even when data write is performed to either one of the volumes constituting a volume pair (P-VOL or S-VOL), data will be written to both the P-VOL and the S-VOL (duplicated writing), so that when the host 2 reads the data, it can either access the storage subsystem 10a (P-VOL) or the storage subsystem 10b (S-VOL).

On the other hand, when the storage subsystem 10a (P-VOL) receives a read request from the host 2, the storage subsystem 10a returns the data read from the P-VOL to the host 2, and when the storage subsystem 10b (S-VOL) receives a read request from the host 2, the storage subsystem 10b returns the data read from the S-VOL to the host 2. At this time, even if the volume set as read target by the read request is the S-VOL, only data read from the S-VOL is performed, and the P-VOL will not be accessed.

Figure 11:
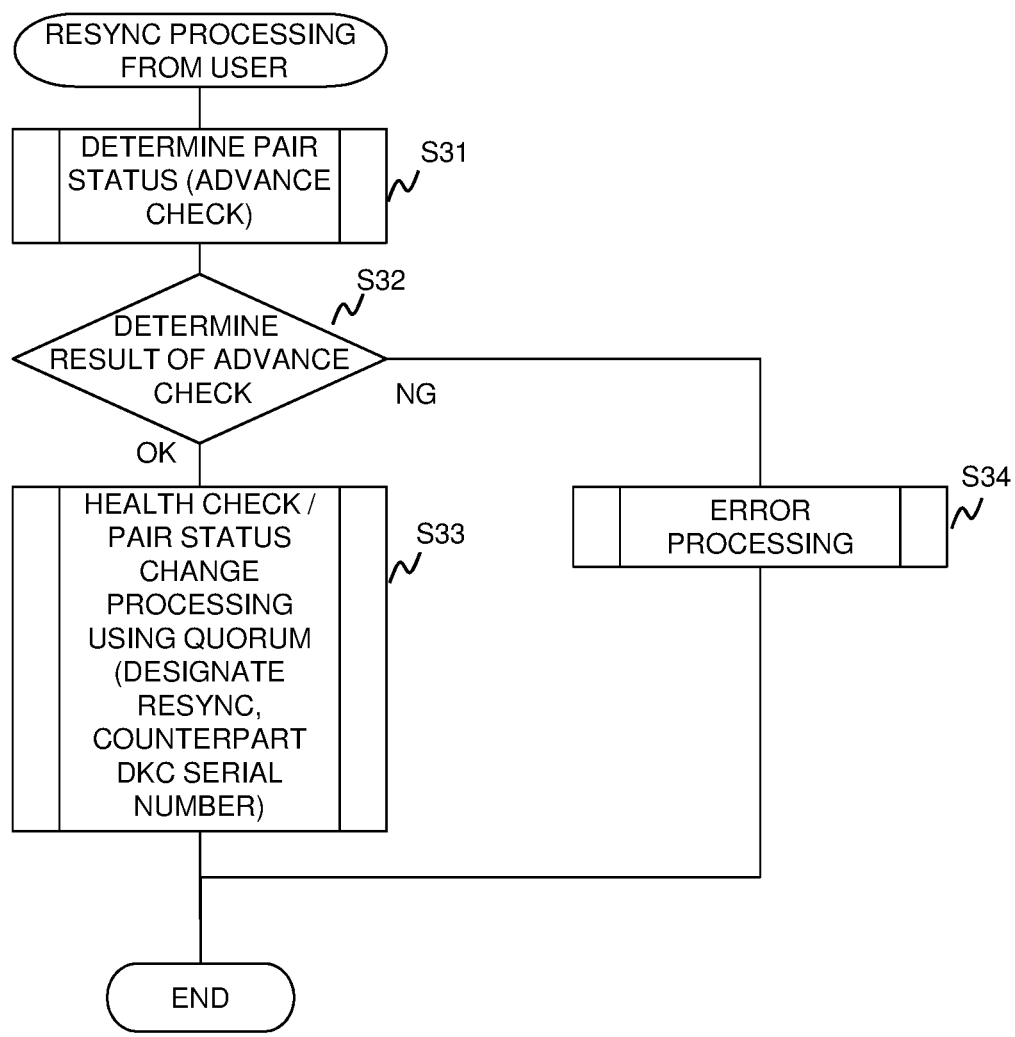
FIG. 11 is a flowchart of a resync processing.

Next, with reference to FIG. 11, the flow of the process performed when the storage subsystem 10 receives an instruction to perform resynchronization (resync) from a user will be described. At this time, a resync program 1004 is executed in the MP 141, and the processes described hereafter are performed.

In S31, the MP 141 receives a resync instruction from the user. The user can issue a resync instruction from the host 2 (or the management terminal) to the storage subsystem 10. Further, information of a volume pair (identifier of P-VOL or S-VOL) being the target of resynchronization is included in the resync instruction. The MP 141 refers to the pair management information T300, and confirms the pair status of the volume pair included in the resync instruction.

When the pair status confirmed in S31 is not a "Suspend state" (S32: OK), resynchronization of the volume pair cannot be performed, so that an error is returned to the host 2 (or the management terminal) (S34), and the process is ended. If the pair status confirmed in S31 is a "Suspend state" (S32: OK), the MP 141 calls the health check/pair status change processing program 1006 using Quorum (S33).

In the parameters passed to the health check/pair status change processing program 1006 using Quorum, "resync" is passed as the processing type. Further, a serial number of the storage subsystem 10 in which the volume in pair relationship exists is passed as the serial number of the target storage subsystem. For example, as a configuration of the storage system 1, P-VOL exists in the storage subsystem 10a and S-VOL exists in the storage subsystem 10b, and when the storage subsystem 10a receives a resync instruction, the serial number of the storage subsystem 10b is passed as the argument of the health check/pair status change processing program 1006 using Quorum.

When the process of S33 is completed, the resync processing is ended.

Figure 12:
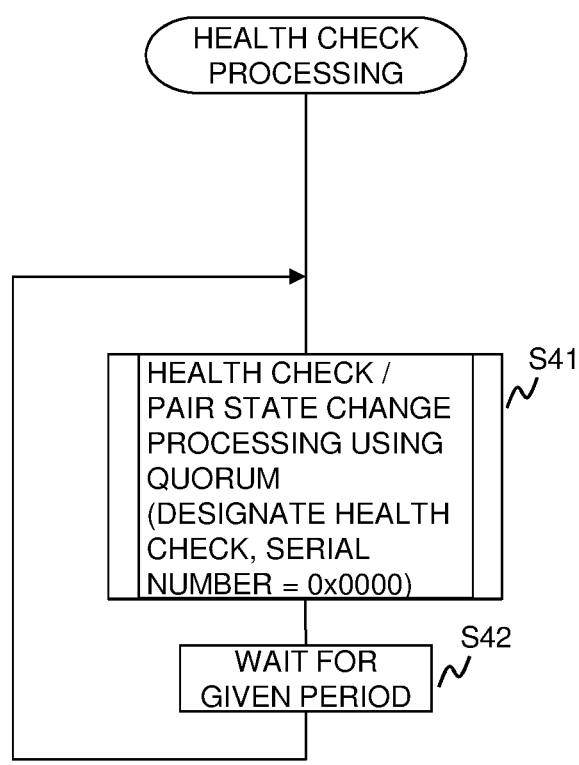
FIG. 12 is a flowchart of a health check processing.

Next, the health check processing will be described with reference to FIG. 12. The health check processing is performed by the MP 141 executing the health check program 1005. When the health check program 1005 is started, the MP 141 calls the health check/pair status change processing program 1006 using Quorum (S41). In the parameters passed to the health check/pair status change processing program 1006 using Quorum in S41, "health check" is designated as the processing type, and 0 is designated as the serial number of the target storage subsystem. Thereafter, the MP 141 waits for a given period (500 ms, for example) (S42), and then the MP 141 executes S41 in a repeated manner. Thereby, the health check/pair status change processing program 1006 using Quorum is executed periodically.

As described, when the I/O (write) processing is performed, when the resynchronization processing of the volume pair is performed, or when the health check processing is performed, the health check/pair status change processing program 1006 using Quorum is called (executed). Hereafter, the flow of the processes executed by the health check/pair status change processing program 1006 using Quorum will be described with reference to FIG. 13 and thereafter.

Figure 13:
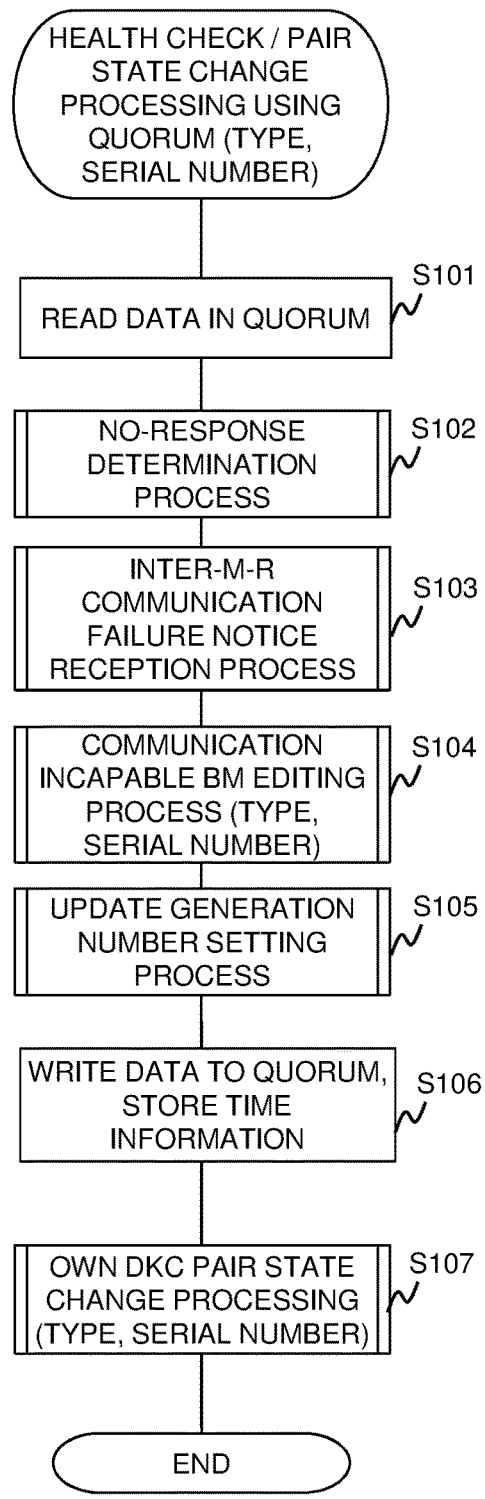
FIG. 13 is a flowchart of a health check/pair state change processing program using a Quorum.

FIG. 13 shows a flow of the overall process executed by the health check/pair status change processing program 1006 using Quorum. The process of FIG. 13 is executed by all storage subsystems 10, and in the following, we will describe the case where the health check/pair status change processing program 1006 using Quorum is executed by the MP 141 of the DKC #k (the storage subsystem 10 writing information to the DKC management information [k] (202-k)). The DKC #k is sometimes referred to as "own DKC" or "own subsystem".

When the health check/pair status change processing program 1006 using Quorum is called from a call source program, at first, the MP 141 reads information stored in the DKC array allocation table 201 and the DKC management information storage area 202 in the Quorum Disk, and stores the same in the DKC management information staging area 200' (S101).

Next, based on the information stored in the DKC management information staging area 200', the MP 141 executes S102 (no-response determination process), S103 (inter-M-R communication failure notice reception process), S104 (communication incapable bitmap editing process), and S105 (update generation number setup process). In the processes of S102 through S105, reference and update of the various information stored in the DKC management information staging area 200' is performed. These processes will be described in detail later.

When the processing to S105 has been completed, the MP 141 writes back the information stored in the DKC management information staging area 200' to the Quorum Disk (S106). The information read in S101 is all the information stored in the DKC array allocation table 201 and the DKC management information storage area 202 in the Quorum Disk, but the information written back to the Quorum Disk in S106 is the information determined to be written by the own subsystem (DKC #k), that is, the DKC management information [k] (202-k). In S106, immediately after completing the process to write back information to the Quorum Disk in S106, the MP 141 acquires the current time information from the clock, and writes the acquired time information to the Quorum storage time area 250.

Finally, in S107, the MP 141 performs an own DKC pair state change processing. In the own DKC pair state change processing, the pair status of a volume of the own subsystem is changed. As a result of performing the processes up to S106, when it is necessary to transit the pair status of the volume pair to "Suspend state", the pair status is changed to Suspend state (the Pair Status (T302) of the volume pair stored in the pair management information T300 is changed to "2", for example). In contrast, if there is a need to transit the volume pair in Suspend state to Duplex state, resynchronization processing of the volume pair is performed, and at the point of time when resynchronization is completed, the pair status is changed to "Duplex" (the Pair Status (T302) of the volume pair stored in the pair management information T300 is changed to "1").

Hereafter, the flow of the processes performed in S102 (no-response determination process), S103 (inter-M-R communication failure notice reception process), S104 (communication incapable bitmap editing process) and S105 (update generation number setup process) will be described. According to these steps, as mentioned earlier, processing using information stored in the DKC management information staging area 200' is performed. In order to prevent lengthy description, the notation method of the various information stored in the DKC management information staging area 200' is determined as follows.

In the information stored in the DKC management information staging area 200', for example, the serial number of DKC #m out of serial number [0] (201-0) through serial number [n−1] (201-(n−1)) in the DKC array allocation table 201 is noted as "DKC array allocation table. serial number [m]".

Further, in order to clearly specify each information in the DKC management information [0] (202-0) through the DKC management information [n−1] (202-(n−1)) stored in the DKC management information staging area 200', the following notation method is adopted.

First, as mentioned earlier, the present example describes a case where the health check/pair status change processing program 1006 using Quorum is being executed in the MP 141 in DKC #k, and this DKC #k (or the MP 141 thereof) is called "own DKC" or "own subsystem". Further, the DKC management information written by the own DKC out of the DKC management information [0] (202-0) through DKC management information [n−1] (202-(n−1)) is called "own DKC management information" (if the DKC #k is the own DKC, it is the DKC management information [k]).

Further, upon specifying the respective information such as the serial number (2020), the update generation number (2021), etc. in the own DKC management information, the "own DKC management information" and the name of the respective information are connected by a "." (period). For example, the serial number or the update generation number within the own DKC management information are respectively denoted as "own DKC management information. serial number", and "own DKC management information. update generation number". Further, previous generation [i] (2028-i) and previous time [i] (2029-i) are also denoted as "own DKC management information. previous generation [i]", and "own DKC management information. previous time [i]" (where i is an integer of 0≤i≤(n−1)).

Further, during the processes of S102 through S105, reference and update is performed one bit at a time in the communication incapable bitmap A (2022), the communication incapable bitmap B (2023), the blockade acceptance bitmap (2024), the response incapable bitmap A (2025), the response incapable bitmap B (2026) and the recovery ongoing bitmap (2027). Therefore, in order to specify a specific bit (such as the j-th bit) in each bitmap, the following notation method is used (where j is an integer of 0≤j≤(n−1)).

(a) The j-th bit in communication incapable bitmap A is denoted as communication incapable BM_A {j}.

(b) The j-th bit in communication incapable bitmap B is denoted as communication incapable BM_B {j}.

(c) The j-th bit in blockade acceptance bitmap is denoted as blockade acceptance BM {j}.

(d) The j-th bit in response incapable bitmap A is denoted as response incapable BM_A {j}.

(e) The j-th bit in response incapable bitmap B is denoted as response incapable BM_B {j}.

(f) The j-th bit in response ongoing bitmap is denoted as response ongoing BM {j}.

Therefore, for example, the j-th bit of communication incapable bitmap A included in the own DKC management information is denoted as "own DKC management information. communication incapable BM_A {j}". As for other bitmaps, a similar notation is adopted to specify each bit.

Further, as for the DKC management information other than the own DKC management information, a similar notation method as the one described above is adopted. That is, when representing each information within the DKC management information [m] (where m is an integer value satisfying 0≤m≤(n−1)), a notation format of connecting the "DKC management information [m]" and the name of the respective information via a "." is used.

Figure 14:
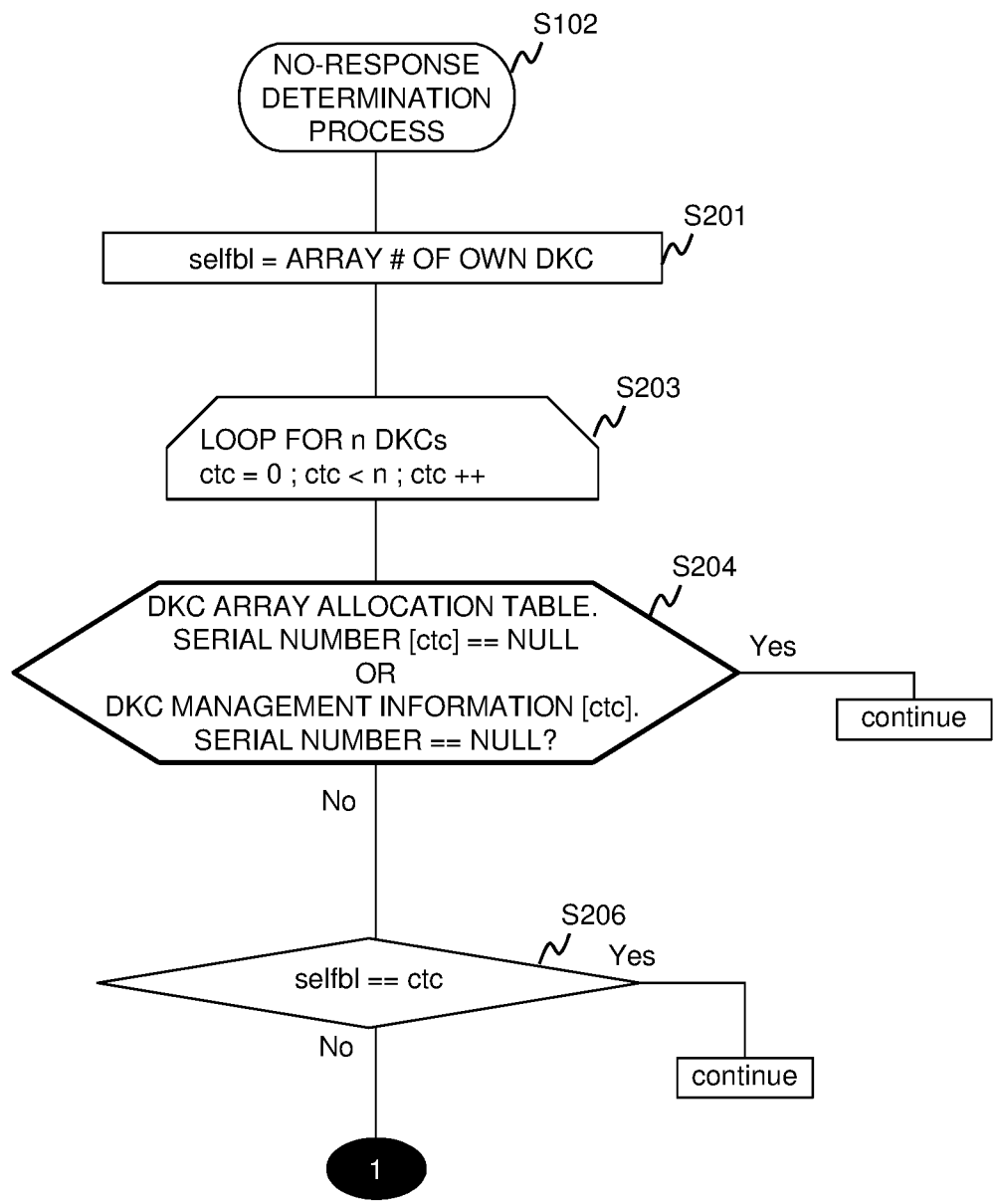
FIG. 14 is a flowchart (1) of a no-response determination process.
Figure 15:
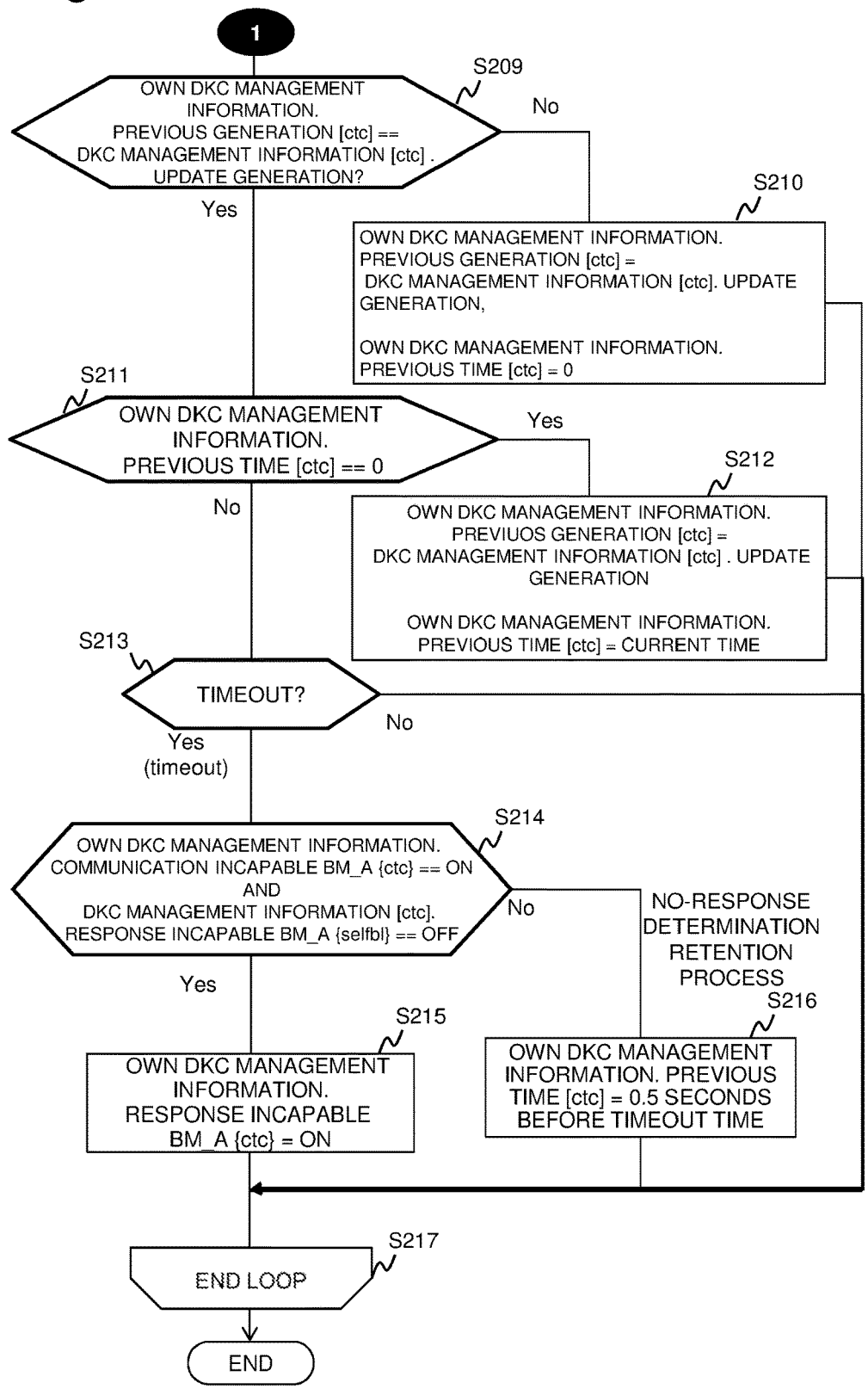
FIG. 15 is a flowchart (2) of the no-response determination process.
Figure 16:
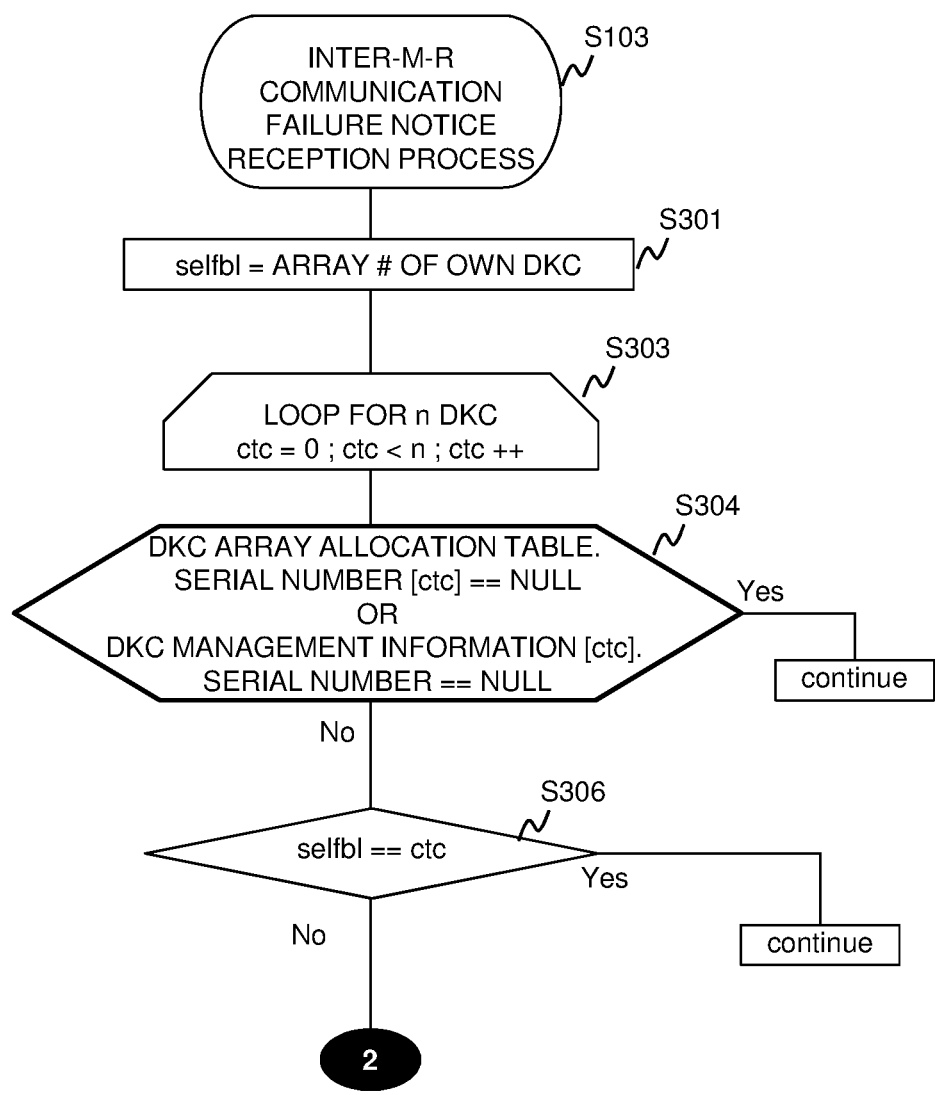
FIG. 16 is a flowchart (1) of an inter-M-R communication failure notice reception process.
Figure 17:
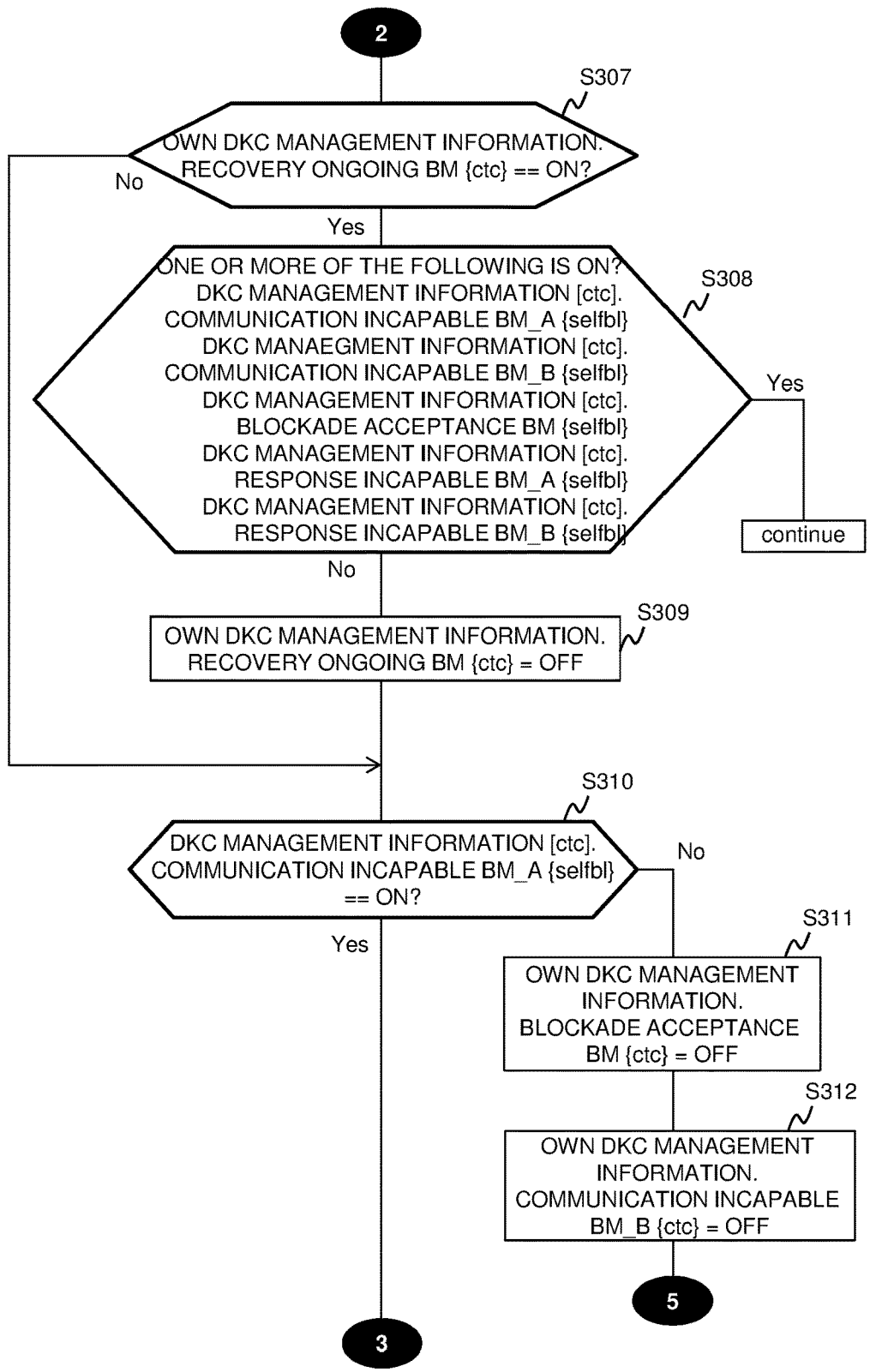
FIG. 17 is a flowchart (2) of the inter-M-R communication failure notice reception process.
Figure 18:
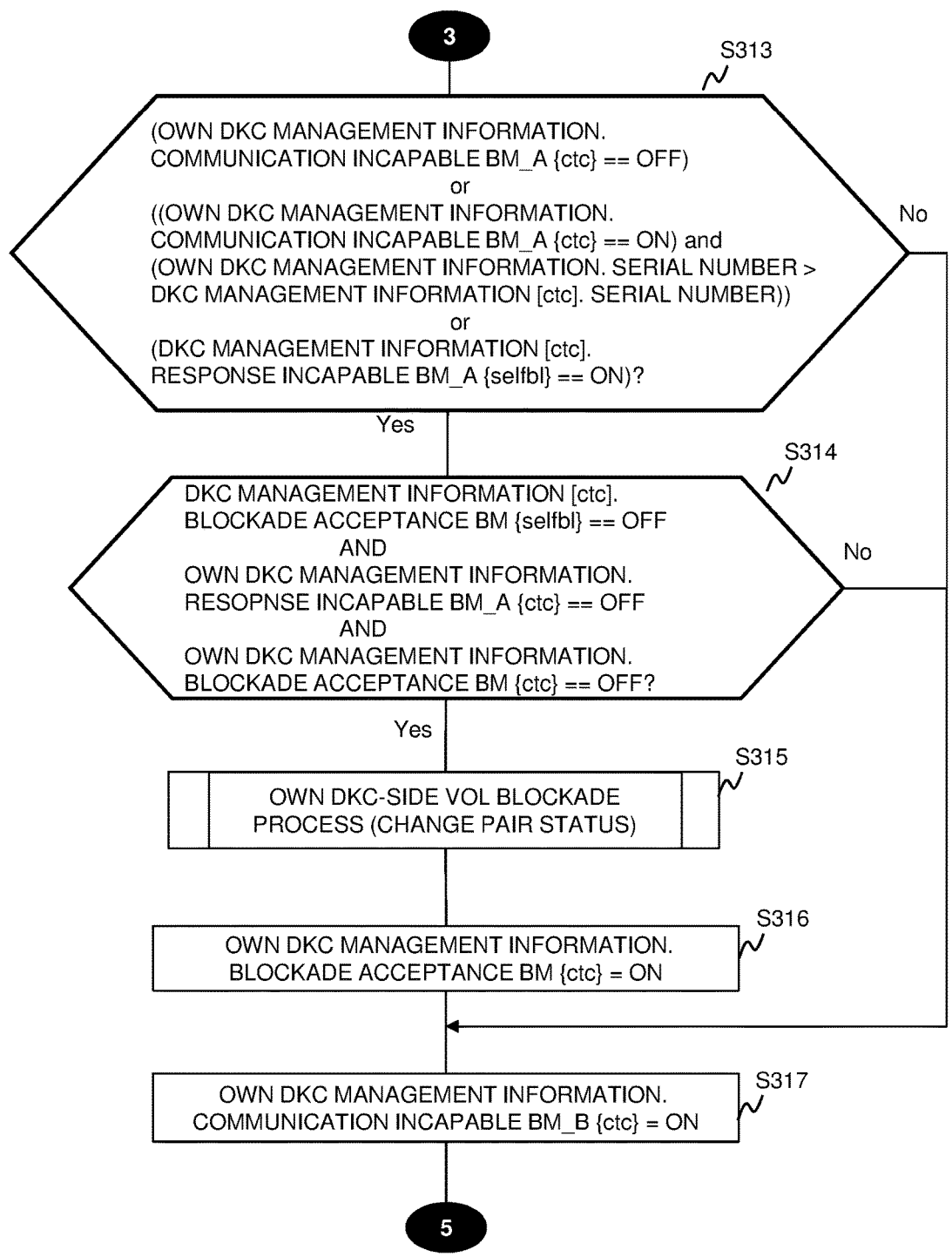
FIG. 18 is a flowchart (3) of the inter-M-R communication failure, notice reception process.
Figure 19:
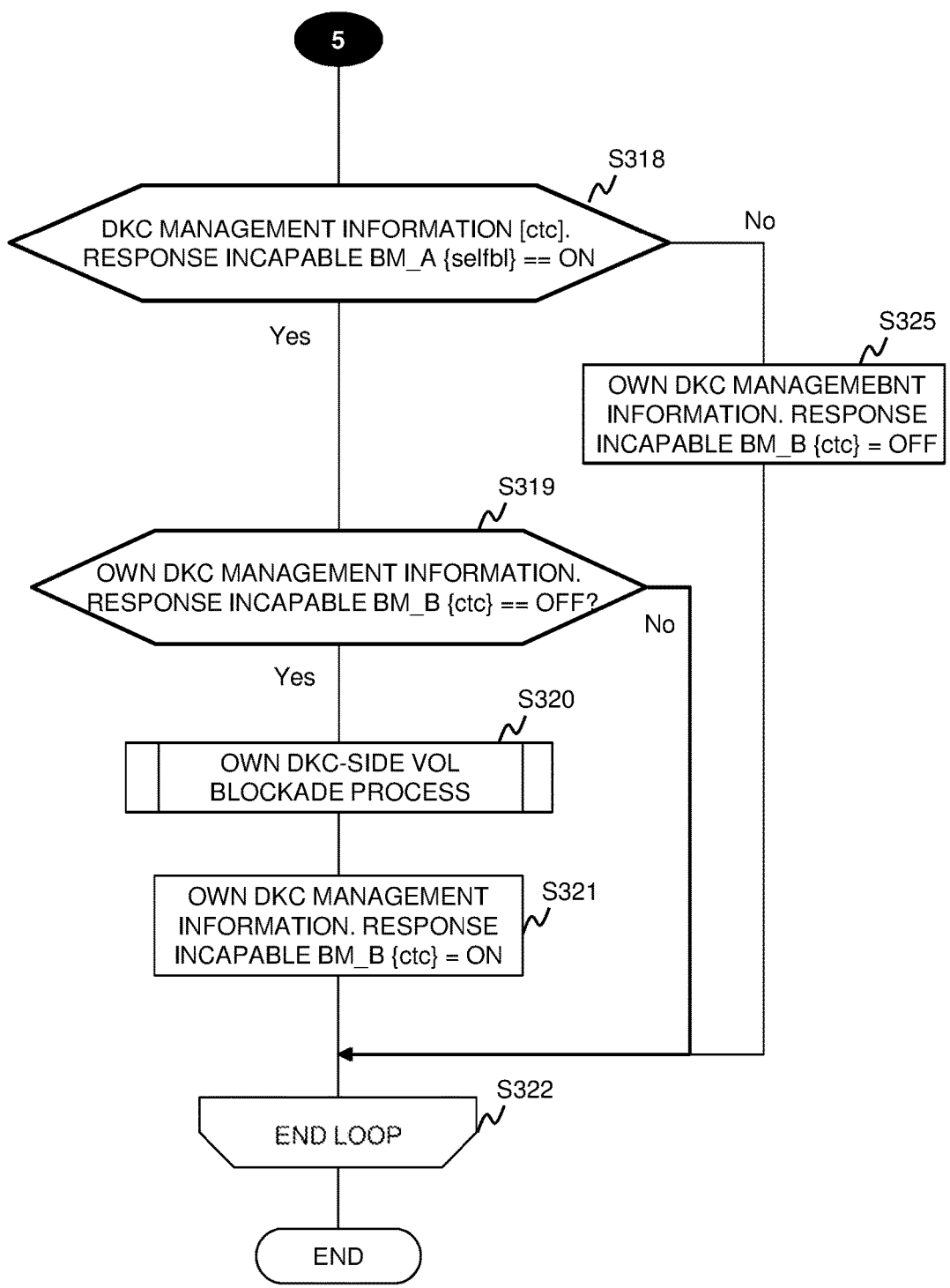
FIG. 19 is a flowchart (4) of the inter-M-R communication failure notice reception process.

We will now return to the description of processes S102 through S105. FIGS. 14 and 15 show a flow of the process of S102, that is, a no-response determination process. In the no-response determination process, a process for determining whether the DKC #m is stopped (due to causes such as failure) is mainly performed by confirming whether the DKC management information [m] (0≤m≤(n−1)) is updated (by the DKC #m).

Incidentally, regarding the expressions illustrated in the subsequent drawings, the expression where the left side and the right side are connected via "=" means the process substituting the value of the right side to the left side. Further, the expression where the left side and the right side are connected via "==" means the process determining whether the value on the left side and the value on the right side are equal or not.

In S201, the MP 141 specifies the array number of the own subsystem. Specifically, from the DKC array allocation table. serial number [0] through DKC array allocation table. serial number [n−1], the one storing the same value as the serial number of its own subsystem is specified. For example, if the DKC array allocation table. serial number [k](0≤k≤(n−1)) is equal to the serial number of the own subsystem, k is specified as the array number of the own subsystem. Hereafter, a case where the array number of the own subsystem is k will be illustrated as an example. In S201, the MP 141 prepares a variable selfbl, and value k is substituted in the variable selfbl. Further, by the process of S201, the MP 141 can specify that out of the information stored in the DKC management information staging area 200' (DKC management information [0] (202-0) through DKC management information [n−1] (202-(n−1))), the DKC management information [selfbl] is the own DKC management information.

Next, the MP 141 executes the loop processing of S203 through S217 for DKC management information [0] through DKC management information [n−1]. In S203, the MP 141 prepares a variable ctc, and substitutes 0 as the initial value. When the MP 141 executes the processes of S204 through S216 once, it adds 1 to the value of the variable ctc, and then performs the processes of S204 through S216 again. Then, at the point of time when the value of the variable ctc has reached n (16, for example), the MP 141 ends the loop processing.

In the drawings of FIG. 14 and thereafter, the area denoted as "continue" (such as the process that the procedure advances to when the result of determination in the determination process of S204 described below is affirmative (S204: Yes)) means that the subsequent processes (S206 and thereafter) are not executed, and that the procedure advances to end of loop (S217). In S217 (end loop), the MP 141 adds 1 to the value of the variable ctc, and if the value of ctc is smaller than n, it executes the processes of S204 through S216 again. However, if the value of ctc becomes equal to or greater than n as a result of having added 1 to the value of the variable ctc, the process is ended. Hereafter, the processes of S204 through S216 will be described.

In S204, the MP 141 determines whether the value of the DKC array allocation table. serial number [ctc] or the DKC management information [ctc]. serial number is NULL (0) or not. If the value of the DKC array allocation table. serial number [ctc] or the DKC management information [ctc]. serial number is NULL (S204: Yes), it means that the storage subsystem having array number ctc is not subjected to the registration processing to the Quorum Disk (the storage subsystem having array number ctc does not exist in the storage system 1). Therefore, in this case, the processes of S205 and thereafter are not performed, and the procedure advances to S217 (end loop). On the other hand, if the values of the DKC array allocation table. serial number [ctc] and the DKC management information [ctc]. serial number are both not NULL (S204: No), the processes of S206 and thereafter are performed.

In S206, the MP 141 determines whether the value of the variable selfbl and the variable ctc are equal or not, and if they are equal (S206: Yes), the processes of S209 and thereafter are not performed, and the procedure returns to S203. The reason is because in S209 and the subsequent steps, by referring to the contents of the DKC management information [ctc] of the storage subsystem other than the own DKC (hereinafter, this is called a "counterpart DKC"), whether the counterpart DKC (DKC #ctc) is stopped or not is determined. If the values of the variable selfbl and the variable ctc are equal, the DKC management information [ctc] is the same as the own DKC management information, and there is no need to refer thereto so that the processes of S209 and thereafter are not performed (the procedure advances to S217). If the values of the variable selfbl and the variable ctc are not equal (S206: No), the processes of S207 and thereafter are performed.

In S209, the MP 141 determines whether the DKC management information [ctc]. update generation is equal to the own DKC management information. previous generation [ctc] or not. If the DKC management information [ctc]. update generation is equal to the own DKC management information. previous generation [ctc] (S209: Yes), it means that the value of the DKC management information [ctc]. update generation has not been changed from the time when the own DKC has previously executed the no-response determination process. In that case, it may be possible that the DKC #ctc is stopped due to causes such as failure, so that further confirmation is performed in S211 and thereafter.

On the other hand, if the determination of S209 is No, it means that the value of the DKC management information [ctc]. update generation has been changed after the own DKC has previously executed the no-response determination process (so it can be determined that the DKC #ctc is operating). In that case, the MP 141 substitutes the value of the DKC management information [ctc]. update generation in the own DKC management information. previous generation [ctc], substitutes 0 in the own DKC management information. previous time [ctc] (S210), and advances to S217. The information of the own DKC management information. previous generation [ctc] and the own DKC management information. previous time [ctc] updated in S210 is used next time the no-response determination process is executed.

In S211, the MP 141 determines whether the own DKC management information. previous time is 0 or not, and if it is not 0 (S211: No), it executes the process of S213, but if it is 0 (S211: Yes), it executes the process of S212. What is meant by the own DKC management information. previous time being 0 is that when the own DKC has executed the no-response determination process previously, S210 has been executed. In other words, this case corresponds to the case where the DKC #ctc has been operating normally until the time the no-response determination process had been previously performed, and is detected for the first time that the update generation has not been updated. In that case, in S212, the MP 141 substitutes the value of the DKC management information [ctc]. update generation to the own DKC management information. previous generation [ctc], and substitutes the current time (the point of time when S212 is performed) acquired from the clock to the own DKC management information. previous time [ctc]. Thereafter, the procedure advances to S217.

In S213, the current time is compared with the DKC management information. previous time [ctc], to determine whether the DKC #ctc has continued a state of no-response for a predetermined time or longer (whether timeout has occurred or not). Specifically, the following comparison is performed:

(current time−own DKC management information.
previous time [ctc])≥threshold (where the threshold is a value of 5 seconds, for example). This threshold is also referred to as a "timeout period" in the following description. The time when S212 has been executed (time when it has been detected for the first time that the update generation is not updated) is stored in the own DKC management information. previous time [ctc]. In other words, in the present process, it is determined whether a time corresponding to the timeout period has elapsed or not from the time when it has been detected for the first time that the update generation is not updated. If timeout has not occurred (the time corresponding to the timeout period has not elapsed from the time when it has been detected for the first time that the update generation is not updated) (S213: No), the procedure advances to S217.

If it is determined that timeout has occurred (S213: Yes), the MP 141 stores information to the own DKC management information indicating that it has determined that the DKC #ctc has not written data to the Quorum Disk for a predetermined time or longer (in other words, that the DKC #ctc is stopped and in a response incapable state). Specifically, the value of the own DKC management information. response incapable BM_A {ctc} is set to "1" (S215).

However, prior to S215, the MP 141 determines if the own DKC management information. communication incapable BM_A {ctc} is "1" and the DKC management information [ctc]. response incapable BM_A {selfbl} is 0 (S214), and when this determination is affirmative, it executes S215. The reason why the determination of S214 is performed is that as the conditions for turning ON the DKC management information [ctc]. response incapable BM_A {selfbl}, in addition to the condition that timeout has occurred (data is not written to the Quorum Disk for a predetermined time or longer), that data transfer from the storage subsystem 10a to the storage subsystem 10b (or the data transfer from the storage subsystem 10b to the storage subsystem 10a) has failed (the determination of S4 of FIG. 9 or 10 is N) is also included in one of the condition.

When data transfer from the storage subsystem 10a to the storage subsystem 10b (or data transfer from the storage subsystem 10b to the storage subsystem 10a) fails, it is highly possible that the storage subsystem 10b (or 10a) is stopped due to failure. In contrast, when only timeout occurs, it is possible that the storage subsystem 10 is operating normally, and only the write process to the Quorum Disk is delayed due to causes such as the load of the storage subsystem 10 being high. Therefore, according to the no-response determination process of the present embodiment, the determination of S214 is performed to more definitely determine that the storage subsystem 10 is stopped.

If the determination of S214 is No, the process of S215 will not be performed. Instead, a time earlier by a given time than timeout time is substituted in the own DKC management information. previous time [ctc] (such as the time 0.5 seconds earlier than the timeout time) (S216), and the procedure is advanced to S217. A timeout time is the time for determining timeout, which satisfies the following relationship:

(time when it was detected that update generation has not been updated (time when S212 is executed)+timeout period=timeout time Next, the flow of the inter-M-R communication failure notice reception process will be described with reference to FIGS. 16 through 19. The processes of S301 through S306 are the same as the processes of S210 through S206 of FIG. 14.

In S307, the MP 141 determines whether the own DKC management information. recovery ongoing BM {ctc} is "1" or not. When the own DKC management information. recovery ongoing BM {ctc} is "1" (S307: Yes), the processes of S308 and S309 are performed.

In S308, the MP 141 determines whether one or more of the following is "1" or not: DKC management information [ctc]. communication incapable BM_A {selfbl}, DKC management information [ctc]. communication incapable BM_B {selfbl}, DKC management information [ctc]. blockade acceptance BM {selfbl}, DKC management information [ctc]. response incapable BM_A {selfbl}, and DKC management information [ctc]. response incapable BM_B {selfbl}. The meaning of any one of these bits being set to "1" is that the DKC #ctc is currently subjected to a recovery process. Therefore, if any one of these bits is "1" (S308: Yes), the procedure advances to S322 (end loop). If these bits are all [0] (S308: No), the MP 141 sets the own DKC management information. recovery ongoing BM {ctc} to "0" (S309).

After the process of S309, or when it is determined in the determination of S307 that the own DKC management information. recovery ongoing BM {ctc} is "0" (S307: No), the MP 141 determines whether the DKC management information [ctc]. communication incapable BM_A {selfbl} is "1" or not (S310). If the DKC management information [ctc]. communication incapable BM_A {selfbl} is "1" (S310: Yes), it means that the counterpart DKC (DKC # ctc) has determined that the data communication using the path between the own DKC and the DKC #ctc is not possible. In that case, the MP 141 determines whether the logical volume of the own subsystem should be set to a blocked state or not by executing the processes of S313 and thereafter. On the other hand, when the DKC management information [ctc]. communication incapable BM_A {selfbl} is "0" (S310: No), the MP 131 sets the own DKC management information. blockade acceptance BM {ctc} and own DKC management information. communication incapable BM_B {ctc} to "0" (S311, S312), and advances to the processes of S318 and thereafter.

In S313, the MP 141 determines whether any one of the following three conditions (a) through (c) is satisfied:

(a) The own subsystem has not yet detected that the path between the own subsystem and the DKC #ctc is cut off (the own DKC management information. communication incapable BM_A {ctc} is 0)

(b) The own subsystem has detected that the path between the own subsystem and the DKC #ctc is cut off (the own DKC management information. communication incapable BM_A {ctc} is 1), and that the serial number of the own subsystem is greater than the serial number of the DKC #ctc (own DKC management information. serial number>DKC management information [ctc]. serial number)

(c) The DKC #ctc has determined that the own subsystem is in a response incapable state (real DKC management information [ctc]. response incapable BM_A {selfbl} is 1).

According to the storage system of the present embodiment, when the path between the storage subsystems 10 has been cut off, the volumes in one of the storage subsystems 10 are set to I/O incapable (invalid state; reception of I/O requests from the host 2 is prohibited). At this time, in principle, control is performed so that the volume of the storage subsystem 10 where reception of I/O requests from the host 2 is ongoing is not set to I/O incapable. Therefore, if data transfer from the storage subsystem 10a to the storage subsystem 10b fails, for example (when the determination of S4 in FIG. 9 is N), in principle, control is performed so that the volume (P-VOL) of the storage subsystem 10a is not set to I/O incapable.

The details will be described later, but when data transfer from the own DKC to the counterpart storage subsystem has failed, the own DKC management information. communication incapable BM_A {ctc} is set to 1. Therefore, when the data transfer from the own DKC to the counterpart storage subsystem fails, the above condition (a) is not satisfied, so that the processes of S314 and thereafter will not be performed. In contrast, in the counterpart DKC, the own DKC management information. communication incapable BM_A {ctc} is set to 0, so that the above condition (a) is satisfied, and the processes of S314 and thereafter will be performed.

Figure 9:
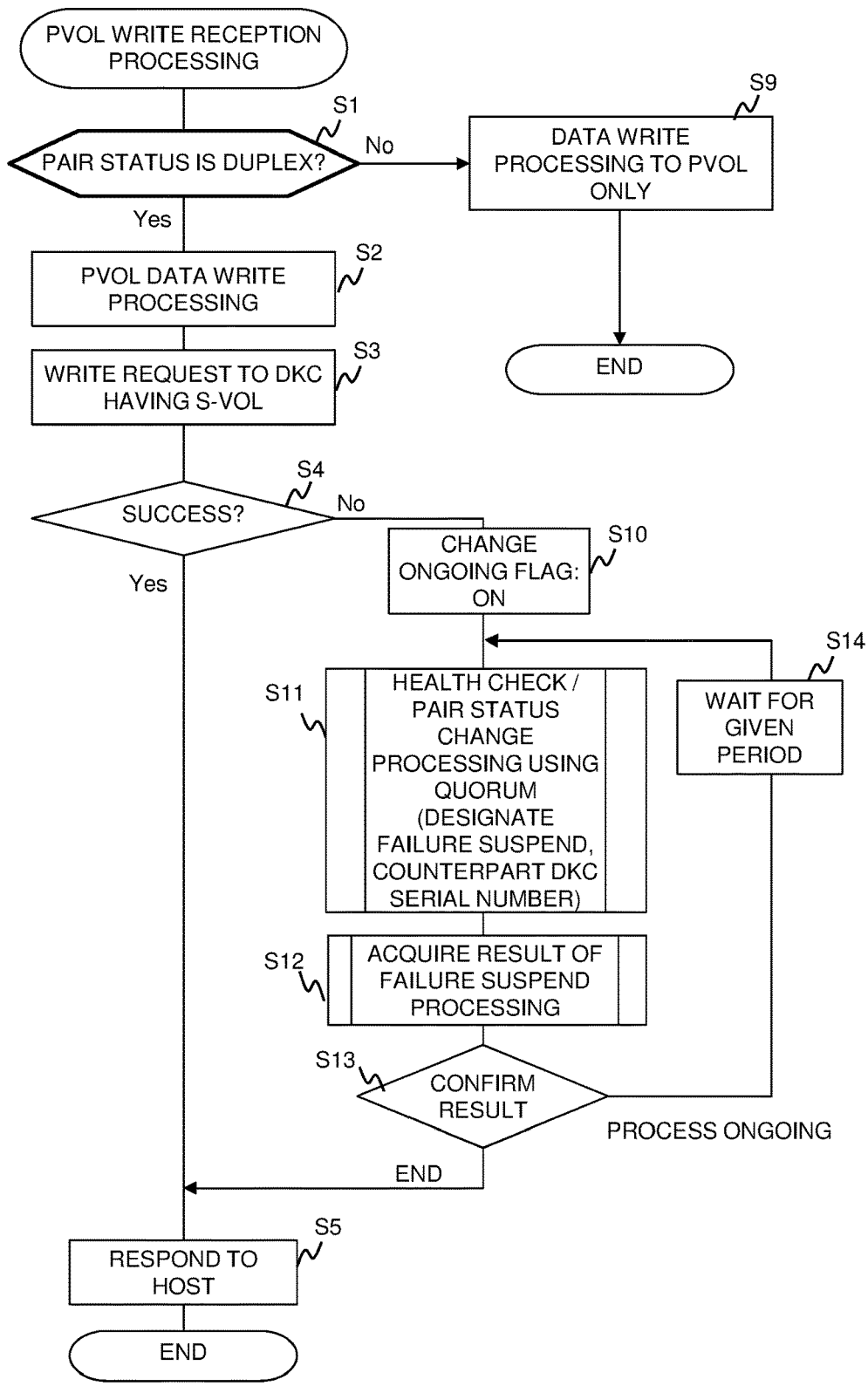
FIG. 9 is a flowchart of a write processing.
Figure 10:
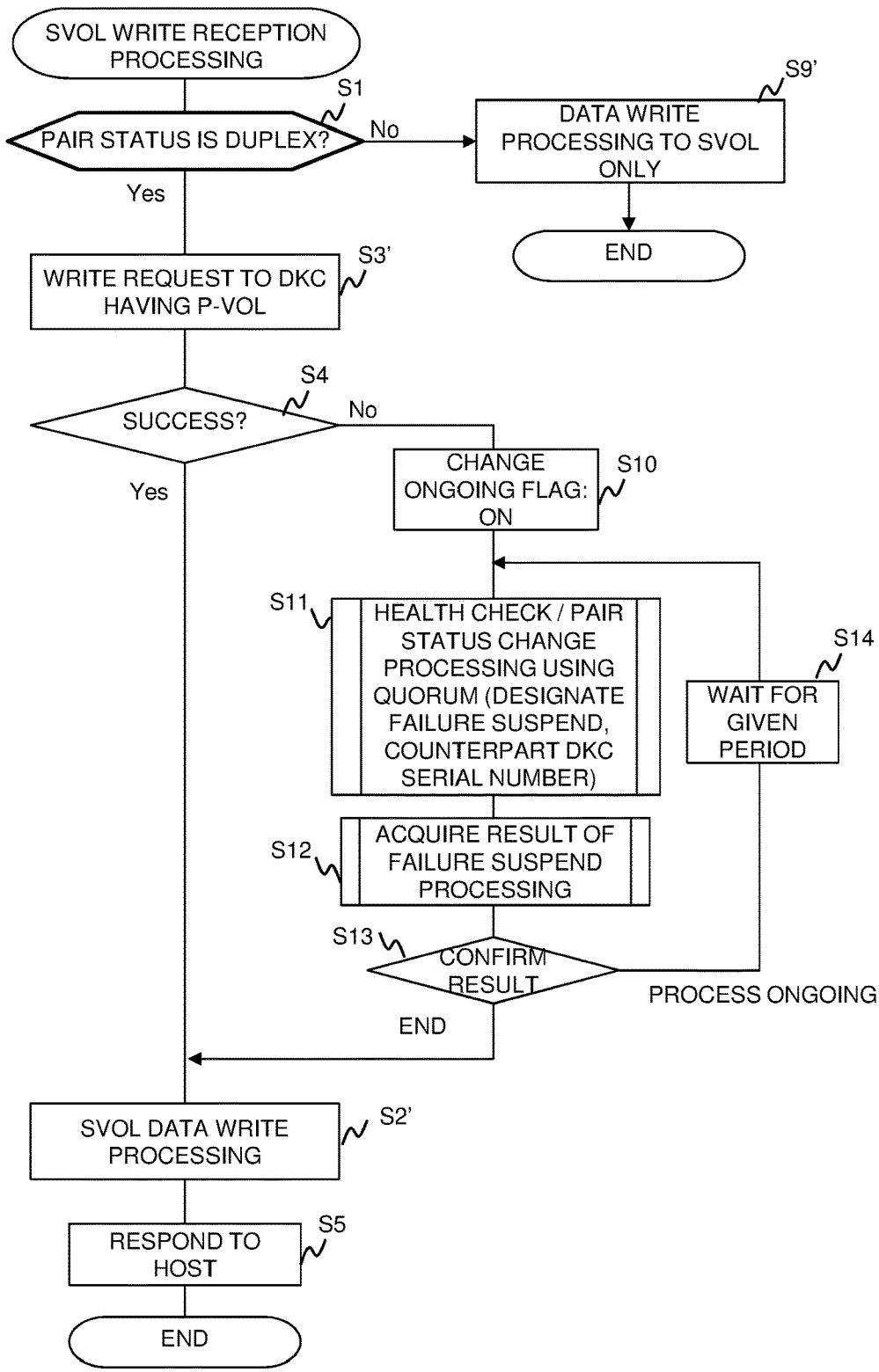
FIG. 10 is a flowchart of a write processing.

However, it is possible that both the storage subsystem 10a and the storage subsystem 10b perform data transfer substantially simultaneously to the counterpart storage subsystem (both the storage subsystems 10a and 10b are performing the processes of FIG. 9 or FIG. 10). In that case, the communication incapable BM_A is set to 1 in both storage subsystems 10. When that happens, control is performed to compare the serial numbers of the own DKC and the counterpart storage subsystem, and to set the volume in the storage subsystem 10 having the greater serial number to I/O incapable. Therefore, condition (b) exists.

Further, when it is already determined in the counterpart storage subsystem that the own DKC is in a response incapable state, control is performed so as not to set the volume of the counterpart storage subsystem to I/O incapable. Condition (c) exists for that purpose.

When any one of the three conditions listed above is satisfied (S313: Yes), the process of S314 is executed. When none of the three conditions is satisfied (S313: No), the processes of S314 through S316 are not executed and the MP 141 executes the process of S317. In S317, the MP 141 sets the own DKC management information. communication incapable BM_B {ctc} to "1" (in other words, stores information notifying that the own subsystem has detected the fact that the counterpart DKC (DKC #ctc) has detected that the path thereto from the own subsystem has been cut off).

In S314, the MP 141 further determines whether all three conditions (d) through (f) listed below are satisfied.

(d) The volume of the DKC #ctc is not in an invalid state (the DKC management information [ctc]. blockade acceptance BM {selfbl} is 0)

(e) The own subsystem has not determined that the DKC #ctc is response incapable (own DKC management information. response incapable BM_A {ctc} is 0)

(f) The volume of the own subsystem is not in an invalid state (the own DKC management information. blockade acceptance BM {ctc} is 0)

The meaning of conditions (d) through (f) will be briefly described. When the counterpart DKC (DKC #ctc) is blocked (or when the volume in the counterpart DKC is set to I/O prohibited (Invalid state)), the volume of the own subsystem should not be set to I/O prohibited. Conditions (d) and (e) exist for that reason.

Further, if the volume of the own subsystem is already I/O prohibited (Invalid state), there is no more processing necessary to set the volume of the own subsystem to I/O prohibited. Condition (f) exists to determine the same.

When the above-listed three conditions are all satisfied (S314: Yes), the MP 141 sets the logical volume of the own subsystem to I/O prohibited (invalid) state (S315). Specifically, the status of the logical volume (Status (T402) of the LDEV Status information T400) is set to "Invalid", and the pair status of the volume pair to which the logical volume of the own subsystem belongs (the Pair Status (T302) of the pair management table T300) is set to "Suspend state".

After S315, the MP 141 sets the own DKC management information. blockade acceptance BM {ctc} to "1" (S316), and executes the processes of S317 and thereafter. The process of S317 is as described earlier.

S318 and the subsequent processes are performed when the counterpart DKC (DKC #ctc) determines the own subsystem to be in a response incapable state. In this case, the logical volume of the own subsystem is set to blocked state.

In S318, the MP 141 confirms whether the DKC management information [ctc]. response incapable BM_A {selfbl} is 1 or not, so as to determine whether the DKC #ctc has decided its own subsystem to be response incapable. If the DKC management information [ctc]. response incapable BM_A {selfbl} is not 1 (S318: No), the MP 141 sets the own DKC management information. response incapable BM_B {ctc} to 0 (S325), and the procedure advances to S322. The process of S325 is a process executed during the resync processing.

When the DKC management information [ctc]. response incapable BM_A {selfbl} is 1 (S318: Yes), the MP 141 determines whether the own DKC management information. response incapable BM_B {ctc} is 0 or not (S319). If the own DKC management information. response incapable BM_B {ctc} is 0 (S319: Yes), the process of S320 is executed. This process is the same as S315. Then, the own DKC management information. response incapable BM_B {ctc} is set to 1 (S321), and the procedure advances to S322.

The case where the own DKC management information. response incapable BM_B {ctc} is 1 (S319: No) is the case where the MP 141 has set the logical volume of its own subsystem to Invalid state by the inter-M-R communication failure notice reception process already performed in the past (S320 and S321 have been executed in the past). Therefore, the processes of S320 and S321 will not be executed, and the procedure advances to S322.

Figure 20:
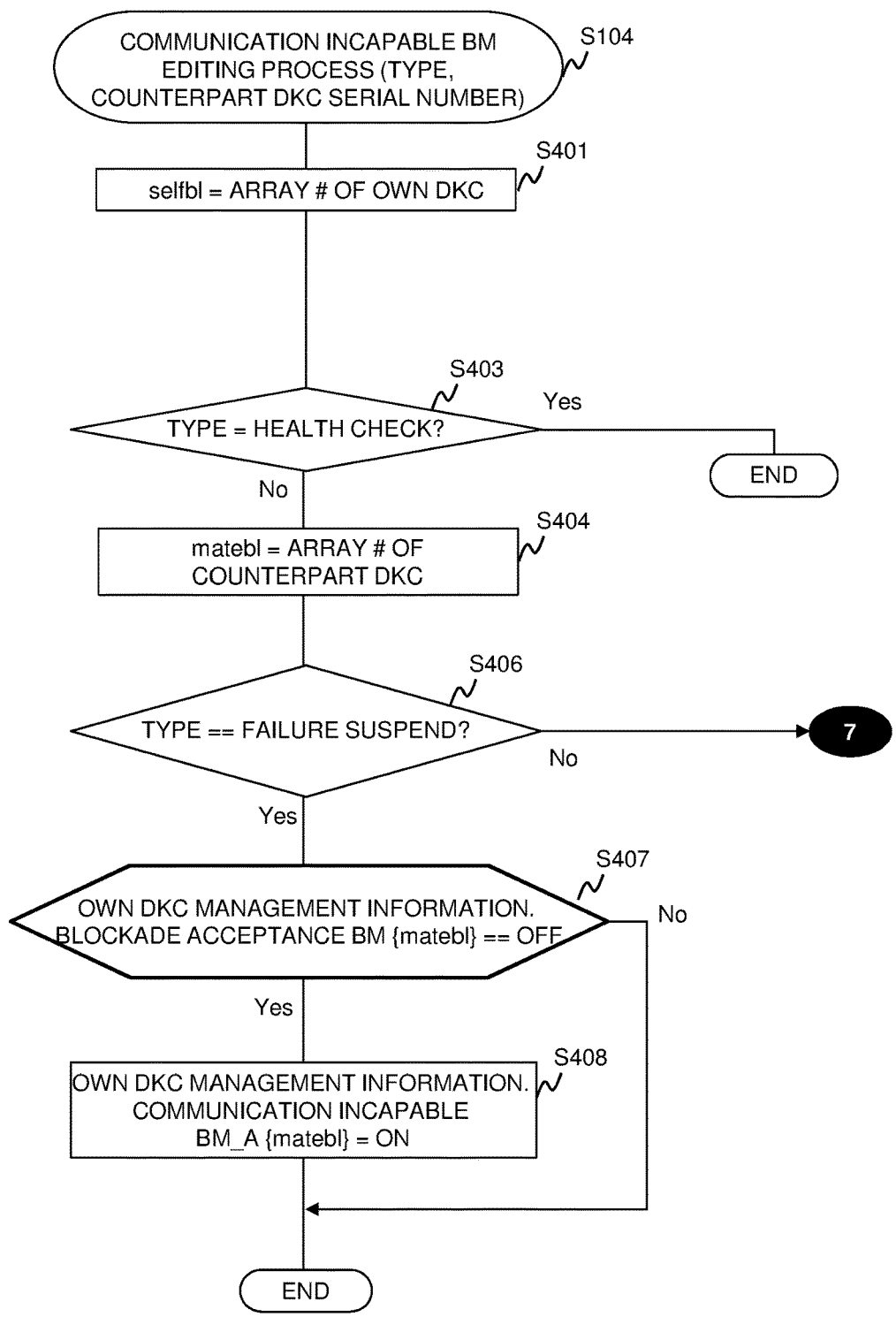
FIG. 20 is a flowchart (1) of a communication incapable bitmap editing process.
Figure 21:
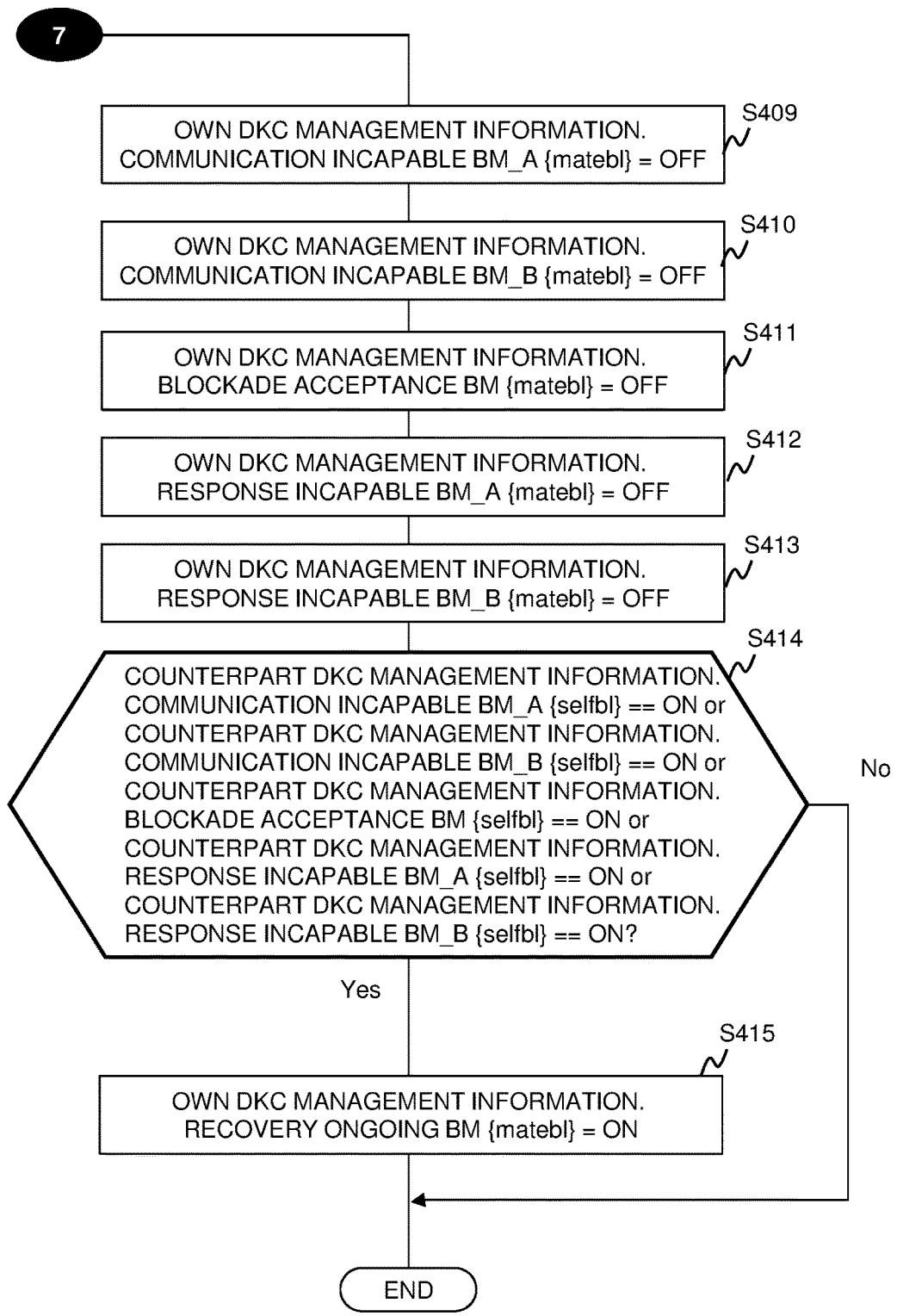
FIG. 21 is a flowchart (2) of the communication incapable bitmap editing process.

Next, the flow of the communication incapable bitmap editing process will be described with reference to FIGS. 20 and 21. The communication incapable bitmap editing process is a process for setting or resetting the own DKC management information. communication incapable BM_A. Since the own DKC management information. communication incapable BM_A is information showing the state where the own DKC is in a state not capable of communicating with a counterpart DKC, it will not be set during the health check processing (FIG. 12). In contrast, in the process related to the write request from the host 2, when the data write to the counterpart DKC has failed (for example, in the case of FIG. 9 S4: N), the own DKC management information. communication incapable BM_A is set. Further, in the case of resync processing (FIG. 11), since the own DKC is capable of communicating with the counterpart DKC, the own DKC management information. communication incapable BM_A is reset.

S401 is the same process as S201 in FIG. 14.

In S403, the MP 141 refers to the processing type passed from the call source program, and determines whether the processing type is "health check" or not. If the processing type is "health check" (S403: Yes), the process is ended. If the processing type is not "health check" (S403: No), the processes of S404 and thereafter are executed.

In S404, the MP 141 specifies the array number of the counterpart DKC. Specifically, out of the DKC array allocation table. serial number [0] through DKC array allocation table. serial number [n−1], the one storing the value equal to the serial number of the counterpart subsystem passed from the call source program is specified. For example, if the DKC array allocation table. serial number [j] (0≤j≤(n−1)) is equal to the serial number of the counterpart subsystem, j is specified as the array number of the counterpart DKC. Hereafter, a case is described assuming that the array number of the counterpart DKC is j.

The MP 141 prepares a variable matebl, and substitutes j in the variable matebl. Thus, it can be specified that the DKC management information [matebl] is the DKC management information of the counterpart DKC. Hereafter, the DKC management information [matebl] is denoted as "counterpart DKC management information".

In S406, the MP 141 refers to the processing type passed from the call source program, and determines whether the processing type is a "failure suspend" or not. If the processing type is "failure, suspend" (S406: Yes), the process of S407 is executed. On the other hand, if the processing type is not "failure suspend" (S406: No), "resync" is designated as the processing type. In that case, the procedure advances to the processes of S409 and thereafter.

In S407, the MP 141 determines if an own DKC management information. blockade acceptance BM {matebl} is 0. In other words, it determines whether the volume of the own DKC in pair relationship with the volume of the counterpart DKC is blocked or not. If the own DKC management information. blockade acceptance BM {matebl} is 0 (S407: Yes; that is, the case that the volume of the own DKC in pair relationship with the volume of the counterpart DKC is not blocked), the MP 141 sets the own DKC management information. communication incapable BM_A {matebl} to 1 (S408).

The processes of S409 and thereafter are processes executed when "resync" is designated as the processing type. The MP 141 sets all of the own DKC management information. communication incapable BM_A {matebl}, the own DKC management information. communication incapable BM_B {matebl}, the own DKC management information. blockade acceptance BM {matebl}, the own DKC management information. response incapable BM_A {matebl}, and the own DKC management information. response incapable BM_B {matebl} to 0 (S409 through S413).

In S414, the MP 141 determines whether any one or more of the following bits is 1 or not; counterpart DKC management information. communication incapable BM_A {matebl}, counterpart DKC management information. communication incapable BM_B {matebl}, counterpart DKC management information. blockade acceptance BM {matebl}, counterpart DKC management information. response incapable BM_A {matebl}, and counterpart DKC management information. response incapable BM_B {matebl}. If one of these bits is 1, the state of the counterpart DKC is not a normal state, so the MP 141 sets the own DKC management information. recovery ongoing BM_A {matebl} to 1 (S415), and ends the process. If all the bits are 0 (S414: No), the process is ended without executing S415.

A communication incapable bitmap editing process during resync is performed in parallel both in the own DKC and in the counterpart DKC. Since the resync processing should preferably be completed in a synchronized manner in the own DKC and the counterpart DKC, in the own DKC, the recovery ongoing BM_A {matebl} is set to 1 until all the communication incapable BM_A {matebl}, the communication incapable BM_B {matebl}, the blockade acceptance BM {matebl}, the response incapable BM_A {matebl} and the response incapable BM_B {matebl} of the counterpart DKC are OFF (0), to maintain the state that resync is in progress. A similar processing is performed in the counterpart DKC.

Figure 22:
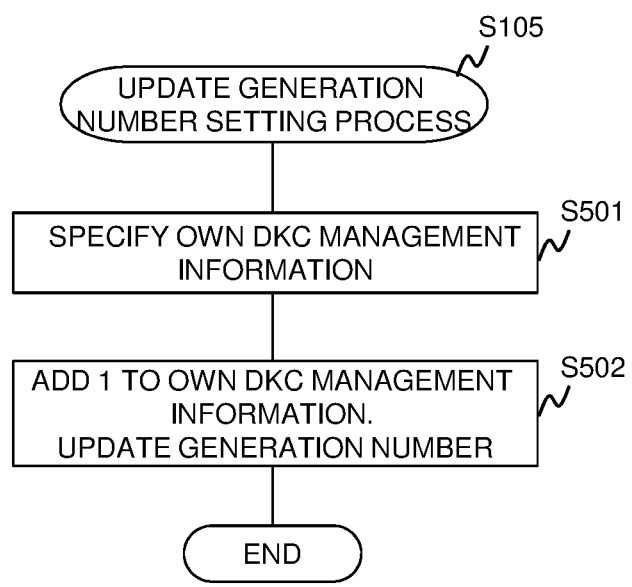
FIG. 22 is a flowchart of an update generation number setup process.

FIG. 22 is a flowchart of an update generation number setup process. The update generation number setup process is a process for adding 1 to the update generation number of the DKC management information of the own DKC (which is called "own DKC management information", similar to the previous setting process). In S501, the MP 141 specifies the array number of the own DKC. This is a similar process as S201. Hereafter, it is assumed that the array number of the own DKC is k, and that the following relationship is satisfied; own DKC management information=DKC management information [k].

In S502, the MP 141 adds 1 to the own DKC management information. update generation number (that is, the DKC management information [k]. update generation number), and ends the process.

Figure 23:
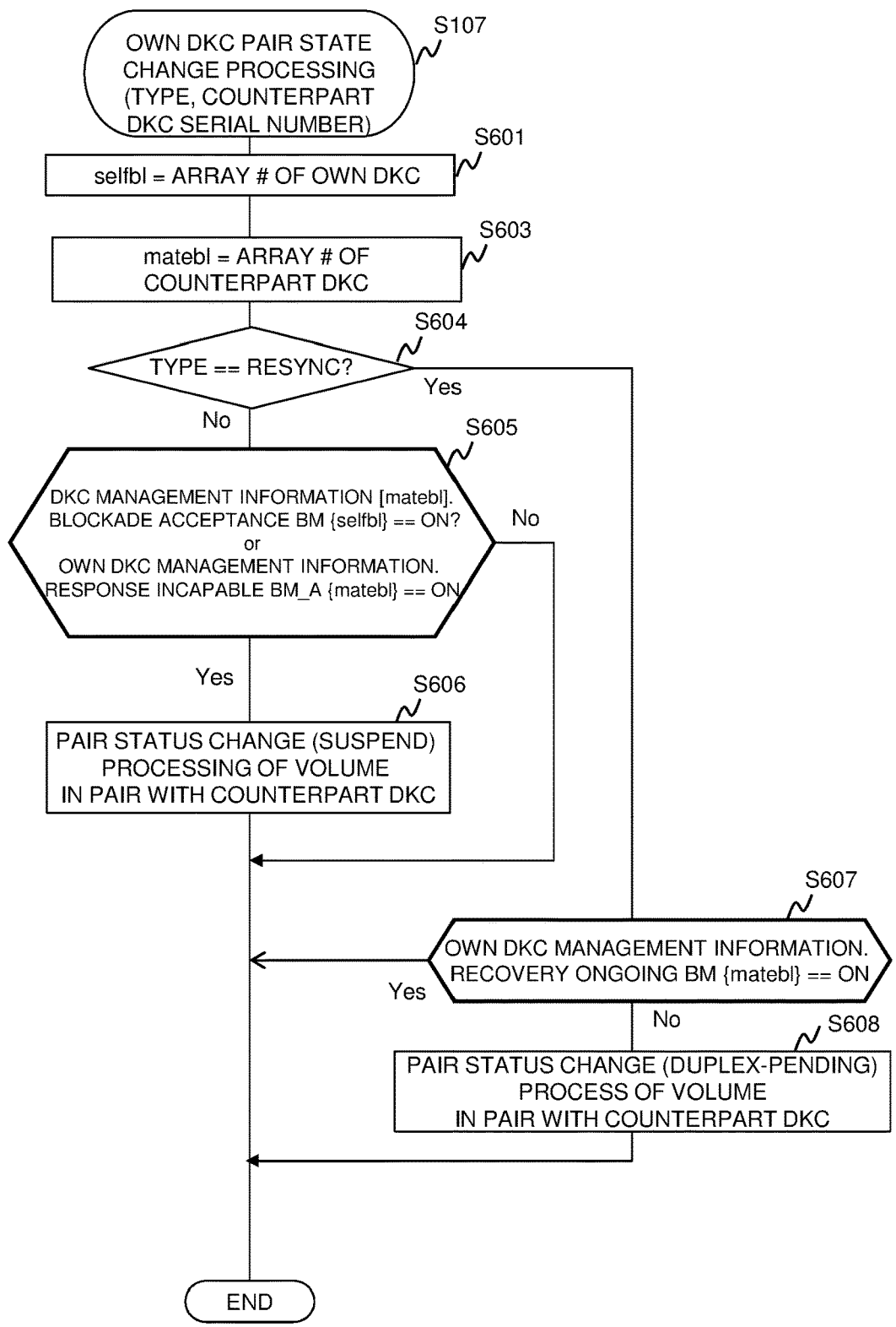
FIG. 23 is a flowchart of an own DKC pair state change processing.

FIG. 23 is a flowchart of the own DKC pair state change processing.

S601 is a process for specifying the array number of the own DKC. This is similar to S201, for example. Further, S603 is a process for specifying the array number of the counterpart DKC. This is a process similar to S404.

In S604, the MP 141 determines whether the processing type passed from the call source program is a resync or not, wherein if the type is resync, the processes of S607 and S608 are executed. If the type is other than resync, the processes of S605 and S606 are executed.

In S605, the MP 141 determines if the volume is Invalid state in the counterpart DKC (whether the DKC management information [matebl]. blockade acceptance BM {selfbl} is 1 or not), or if the counterpart DKC is in a response incapable state (whether the own DKC management information. response incapable BM_A {matebl} is 1 or not). If any of the conditions is satisfied (S605: Yes), the MP 141 changes the pair status (T302) of the volume in pair relationship with the volume in the counterpart DKC within the pair management table T300, sets the change-ongoing flag (T307) to OFF (S606), and ends the process. If it is determined in S605 that none of the conditions are satisfied (S605: No), the MP 141 ends the process without executing S606.

When the volume is set to invalid state in the counterpart DKC, or when the counterpart DKC is in a response incapable state, the volume pair is in a synchronization incapable state, so that regarding the volume in pair relationship with the volume of the counterpart DKC (DKC #matebl) out of the volume pairs on the own DKC side, the pair status (Pair Status (T302) in the pair management table T300) is changed to 2 (Suspend). Further, the status of the volume (Status (T402)) is set to "Valid".

In S607, the MP 141 determines whether the own DKC management information. recovery ongoing BM {matebl} is ON (1) or not. If it is OFF (0) (S607: No), it means that the counterpart DKC is also recovered. Therefore, the MP 141 changes the pair status (T302) of the volume in pair relationship with the volume of the counterpart DKC in the pair management table T300 to 3 (Duplex-Pending), sets the change-ongoing flag (T307) to OFF (S608), and ends the process.

(6) Specific Example

In the following description, we will describe the flow of the process performed in the storage system 1, taking as an example a case where failure has occurred to the storage subsystem 10, or where failure has occurred to a path (inter-DKC path) between the storage subsystem 10a and the storage subsystem 10b. Lastly, we will describe the operation of the storage system 1 of the case where data write to the Quorum Disk is delayed.

(6-1) When Failure Occurs to the Storage Subsystem 10

In the following description, as one example, we will describe a case where failure has occurred to the storage subsystem 10b, and that the storage subsystem 10b has stopped. As described above, it is possible to have more than two storage subsystems 10 included in the storage system 1, but in the following description, for sake of simplified description, we will describe a configuration where only two storage subsystems 10 (storage subsystems 10a and 10b) exist in the storage system 1, in addition to the host 2 and the Quorum Storage 15. It is assumed that P-VOL exists in the storage subsystem 10a, and that the S-VOL in pair relationship with the P-VOL exists in the storage subsystem 10b. Further, as a result of performing the registration processing to the Quorum Disk, it is assumed that the array number of the storage subsystem 10a is 0 and that the array number of the storage subsystem 10b is 1.

When the storage subsystem 10a receives a write request to the P-VOL from the host 2, the I/O program 1001 is executed in the storage subsystem 10a, that is, the process of FIG. 9 is executed. In the process of executing the process of FIG. 9, a write request is issued to the S-VOL (the storage subsystem 10b in which the S-VOL exists) (S3 of FIG. 9), but since the storage subsystem 10b is stopped due to the occurrence of failure, the write process to the S-VOL fails. Therefore, the I/O program 1001 calls the health check/pair status change processing program 1006 using Quorum (S11).

When the health check/pair status change processing program 1006 using Quorum is executed, as described above, the MP 141 reads the information of the DKC array allocation table 201 and the DKC management information storage area 202 to the DKC management information staging area 200', and performs the processes of S102 and thereafter. Further, when the health check/pair status change processing program 1006 using Quorum is executed in the MP 141 of the storage subsystem 10a, the DKC management information [0] is the own DKC management information, and the DKC management information [1] is the counterpart DKC management information (since the array numbers of the storage subsystems 10a and 10b are 0 and 1, respectively).

Now, the flow of the process performed when S102 (no-response determination process) is carried out in the storage subsystem 10a will be described. In a configuration where only two storage subsystems 10a and 10b exist in the storage system 1, during the no-response determination process, only the process of comparing the own DKC management information (the DKC management information [0]) with the DKC management information [1] is performed.

If the storage subsystem 10b is stopped, the update of the update generation number of the DKC management information [1] is also stopped. Therefore, when the storage subsystem 10a performs the determination of S209, the determination result will become Yes, and S211 is executed. When S211 is executed for the first time after the storage subsystem 10b has stopped, 0 is stored in the own DKC management information. previous time. Therefore, in S212, the MP 141 substitutes the value of the DKC management information [1]. update generation to the own DKC management information. previous generation [1], and substitutes the current time to the own DKC management information. previous time [1], and the no-response determination process (S102) is ended.

Next, the MP 141 of the storage subsystem 10a executes S103 (inter-M-R communication failure notice reception process). However, when S103 is executed for the first time after the storage subsystem 10b has stopped, no significant process (such as setting a specific bitmap to ON) will be performed, as described below.

When the determination process of S307 is executed, since the own DKC management information. recovery ongoing BM [1] is 0, the processes of S308 and S309 will not be performed, and the determination process of S310 will be performed. In the determination process of S310, since the DKC management information [1]. communication incapable BM_A {0} is OFF (0) (since the storage subsystem 10b has stopped because of failure, the subsystem is stopped without turning ON the DKC management information [1]. communication incapable BM_A {0}), then in S311 and S312, the own DKC management information. blockade acceptance BM {1} and the own DKC management information. communication incapable BM {1} are turned OFF. Thereafter, the processes of S318 and thereafter are executed.

In the determination of S318, the DKC management information [1]. response incapable BM_A {0} is OFF (0) (similar to the reason described above; since the storage subsystem 10b has stopped because of failure, the subsystem is stopped without turning ON the DKC management information [1]. response incapable BM_A {0}), so that the own DKC management information. response incapable BM_B {1} is turned OFF (S325), and the inter-M-R communication failure notice reception process is ended.

Next, the MP 141 of the storage subsystem 10a executes S104 (communication incapable bitmap editing process). At this time, since "failure suspend" is designated as the processing type from the call source program, the processes of S407 and S408 are executed. As a result of the processes of S407 and S408, the MP 141 turns the own DKC management information. communication incapable BM_A {1} to ON, and ends the process (further, the process for setting the volume to Invalid state has not been performed in the own DKC (storage subsystem 10a), the determination of S407 (if the own DKC management information. blockade acceptance BM {1} is OFF?) will be Yes).

Next, the MP 141 of the storage subsystem 10a will execute S105 (update generation number setup process). Here, 1 is added to the own DKC management information. update generation number. Thereafter, in S106, the own DKC management information is written back to the Quorum Disk.

Further, S107 is executed after S106, but in this stage, the own DKC management information. response incapable BM_A {1} is 0, so that in S107, pair status change will not be performed, and the health check/pair status change processing program 1006 using Quorum is ended.

Until the status of all volume pairs are changed, after a given period of time (S14), the health check/pair status change processing program 1006 using Quorum is repeatedly performed (S11). We will now describe the case where S11 is executed in the storage subsystem 10a when the timeout period elapsed after the storage subsystem 10b became non-responding (data is not being written to the Quorum Disk).

In that case, during S102 (no-response determination process), since the determination of timeout (S213) is performed, the determination of S214 is performed. Before this process is performed, the own DKC management information. communication incapable BM_A {1} is set to ON (by the step S408 in the communication incapable bitmap editing process being executed). Since the DKC management information [1]. response incapable BM_A {0} is OFF, the own DKC management information. response incapable BM_A {1} is turned ON (S215).

Since the own DKC management information. response incapable BM_A {1} is turned ON, in S107 which is performed thereafter (pair status change of volume pair of own subsystem), the storage subsystem 10a changes the pair status of the volume in pair relationship with the storage subsystem 10b to Suspend (as mentioned earlier, in this case, the status of the volume (Status (T402)) is set to "Valid", and the I/O requests from the host 2 can be received), the execution (S11) of the health check/pair status change processing program 1006 using Quorum is ended. Thereafter, the storage subsystem 10a resumes the I/O processing received from the host 2 (S12, S13, S5).

As described, the storage subsystem 10a confirms that the storage subsystem 10b is stopped (and therefore, the S-VOL cannot be accessed) by referring to the health check information (DKC management information) that the storage subsystem 10b periodically writes into the Quorum Disk, and after confirming that the storage subsystem 10b is stopped, resumes the I/O processing. Thereby, the host 2 is prevented from accessing erroneous data (S-VOL).

On the other hand, the storage subsystem 10b is restarted after the failure that has occurred in the storage subsystem 10b has been restored. After being restarted, the health check program 1005 is executed in the storage subsystem 10b to read the Quorum Disk, and the contents of the DKC management information read from the Quorum Disk are referred to. In the present example, as a result of reading the Quorum Disk, the storage subsystem 10b confirms that the DKC management information [0]. response incapable BM_A {1} is ON. Thereby, the storage subsystem 10b recognizes that the storage subsystem 10a set the volume pair in a Suspend state since the storage subsystem 10b became non-responding (stopped by failure or other causes).

Therefore, the storage subsystem 10b sets the pair status (T302) of each volume pair of the pair management table T300 to 2 (Suspend). Also, in each logical volume stored in the LDEV Status information T400, the Status (T402) of the logical volumes in pair relationship with the volumes in the storage subsystem 10a is set to 1 (invalid). Thereby, the storage subsystem 10b will not receive I/O requests from the host 2 to the volumes in pair relationship with the volumes in the storage subsystem 10a, and the host 2 can be prevented from accessing erroneous data. Thereafter, when the user issues a resync instruction to the storage subsystem 10, resync (resynchronization) is performed in the storage subsystem 10, and the status of the volume pairs in the storage subsystems 10a and 10b will be in Duplex state. After resync is completed, the storage system 1 starts normal operation.

In the flow of the process described above, if the DKC management information [0]. response incapable BM_A {1} is not ON, the storage subsystem 10b will not set the Status (T402) of the volume to Invalid by the restarting process. The case where the DKC management information [0]. response incapable BM_A {1} is not ON at the time of restarting, for example, that the storage subsystem 10b has stopped because of failure, but no write request has arrived from the host 2 in that state. In that case, since the contents of the volumes in the storage subsystems 10a and 10b coincide (are synchronized), there is no need for resynchronization (the Duplex state can be maintained). Therefore, according to the storage system 1 of the present embodiment, the storage subsystem 10b will not set the Status (T402) of the volume to Invalid if the DKC management information [0]. response incapable BM_A {1} is not ON. However, in another preferred embodiment, the Status (T402) of each logical volume can be uniformly set to Invalid when restarting the storage subsystem 10.

(6-2) When Failure Occurs to the Inter-DKC Path

In the following description, we will describe, as an example, a case where failure has occurred to the path connecting the storage subsystems 10a and 10b (however, the storage subsystems 10 are operating normally). Similar to (6-1), a configuration is illustrated as an example where only two storage subsystems 10 (storage subsystems 10a and 10b) exist in addition to the host 2 and the Quorum Storage 15 in the storage system 1. It is assumed that P-VOL exists in the storage subsystem 10a, and S-VOL in pair relationship with the P-VOL exists in the storage subsystem 10b. Further, it is assumed that as a result of executing the registration processing to the Quorum Disk, the array number of the storage subsystem 10a is 0 and the array number of the storage subsystem 10b is 1.

Similar to the case of (6-1), when the storage subsystem 10a receives a write request to the P-VOL from the host 2, the process of FIG. 9 is executed. During execution of the process of FIG. 9, a write request is issued to the S-VOL (storage subsystem 10b having the S-VOL) (S3, FIG. 9), but since a failure has occurred to the inter-DKC path, the write processing to the S-VOL fails (incidentally, if there are multiple inter-DKC paths, the write processing to the S-VOL will fail when failure has occurred to all the inter-DKC paths). Therefore, the I/O program 1001 calls the health check/pair status change processing program 1006 using Quorum (S11).

Similar to the case of (6-1), in this case, the health check/pair status change processing program 1006 using Quorum is executed for a few times (until the change of the pair status is completed). When executing the first health check/pair status change processing program 1006 using Quorum, a process similar to the one described in (6-1) will be executed, and the own DKC management information. communication incapable BM_A {1} is set to ON.

In the case of (6-1), when/the health check/pair status change processing program 1006 using Quorum is executed in the storage subsystem 10a after the storage subsystem 10b becomes non-responding and the timeout period has elapsed, the own DKC management information. response incapable BM_A {1} is turned ON (S215). On the other hand, in the case of (6-2), since the storage subsystem 10b has not stopped, the writes from the storage subsystem 10b to the Quorum Disk will be executed successively. Therefore, in the storage subsystem 10a, the own DKC management information. response incapable BM_A {1} will not be turned ON.

However, in the case of (6-2), the storage subsystem 10b refers to the contents of the own DKC management information (DKC management information [0]) that the storage subsystem 10a has written into the Quorum Disk by the health check processing (S41) executed periodically by the storage subsystem 10b. Thereby, it is detected that the contents of the own DKC management information. communication incapable BM_A {1} has been changed. Hereafter, the status transition of various management information occurred by executing the health check processing in the storage subsystem 10b will be described. In the following description, the state transition in the storage subsystem 10b after the storage subsystem 10a has turned the own DKC management information. communication incapable BM_A {1} ON will be described.

When the health check processing is executed in the storage subsystem 10b, the health check/pair status change processing program 1006 using Quorum is called, and the process of S101 through S107 will be executed. In the no-response determination process (S102), nothing special will be performed. This is because both storage subsystems 10a and 10b are not stopped, and the update generation number is periodically written into the Quorum Disk.

In S103 (inter-M-R communication failure notice reception process), since the DKC management information [0]. communication incapable BM_A {1} is ON, the processes of S313 through S317 are executed. As a result, in the storage subsystem 10b, the S-VOL is set to blocked (Invalid) state (S315), and the own DKC management information. blockade acceptance BM {0} (DKC management information [1]. blockade acceptance BM {0}) is turned ON (S316). Thereby, since the storage subsystem 10b will not accept I/O requests from the host 2 to the volume in pair relationship with the volume in the storage subsystem 10a, it becomes possible to prevent the host 2 from accessing erroneous data.

Then, in S317, the storage subsystem 10b sets the own DKC management information. communication incapable BM_B {0} (DKC management information [1]. communication incapable BM_B {0}) to "1" (in other words, stores that the own subsystem (DKC #1) detected the fact that the counterpart DKC (DKC #0) had detected that the path to the own subsystem (DKC #1) had been cut off). The information (DKC management information [1]. blockade acceptance BM {0}, and DKC management information [1]. communication incapable BM_B {0}) updated here is written to the Quorum Disk in S106.

The information written to the Quorum Disk by the health check processing (S41) of the storage subsystem 10b is read by the health check/pair status change processing program 1006 using Quorum executed by the storage subsystem 10a. The health check/pair status change processing program 1006 using Quorum executed by the storage subsystem 10a detects that the DKC management information [1]. blockade acceptance BM {0} is ON (S605).

When the DKC management information [1]. blockade acceptance BM {0} is ON, in the DKC #1 (that is, in the storage subsystem 10b), the volume in pair relationship with the DKC #0 (storage subsystem 10a) is in Invalid state (simultaneously, the pair status is in Suspend state).

Therefore, since the storage subsystem 10a can recognize that the S-VOL of the storage subsystem 10b is in a state not capable of accepting I/O requests from the host 2, the storage subsystem 10a changes the pair status of the volume pair in pair relationship with the storage subsystem 10b to Suspend (however, the status of the volume (the Status (T402) of the LDEV Status information T400) is set to 0 (Valid) so as to enable reception of I/Os from the host 2). Thereafter, the storage subsystem 10a resumes the processing regarding the write request received from the host 2, and returns a response to the host (S5).

In the above description, the state transition of the storage system 1 when the host 2 issues a write request to the P-VOL (in the storage subsystem 10a) has been described, but a process similar to the one described above will also be performed when the host 2 issues a write request to the S-VOL (storage subsystem 10b). When the storage subsystem 10b confirms that the P-VOL (in the storage subsystem 10a) is set to a blockade (Invalid) state, it resumes the process regarding the write request.

(6-3) When Writes to the Quorum Disk is Delayed

In the case of (6-2) described above, it is assumed that the storage subsystem 10b periodically executes the health check processing (S41) in storage subsystem 10b. However, there may be a case where the health check processing is not periodically performed in the storage subsystem 10b, and the writes to the Quorum Disk is delayed. Such case occurs, for example, when the load of the MP 141 in the storage subsystem 10b becomes excessive. Even in such case, it is necessary to prevent the host 2 from accessing erroneous data.

In the following description, similar to (6-2), we will describe a case where a failure has occurred to the path between the storage subsystems 10a and 10b (however, the storage subsystems 10 are operating normally). The configuration of the storage system 1 is the same as that described in (6-1) or (6-2). In (6-3), we will assume a case where the storage subsystem 10b is operating normally, but the storage subsystem 10b is in a state not capable of periodically performing the health check processing due to reasons such as the MP 141 being in an overload state, and as a result, the health check processing is not performed for a given period of time or longer (such as the timeout period described above or longer).

In this case, the storage subsystem 10b is operating normally, but the health check information is not written to the Quorum Disk, so that similar to the case described in (6-1), the storage subsystem 10a sets the own DKC management information. response incapable BM_A {1} to ON (S215), and changes the pair status of the volume (P-VOL) in pair relationship with the storage subsystem 10b to Suspend (the pair status of the volume is changed by executing S107 (own DKC pair state change processing)). At this time, however, the status of the volume of the storage subsystem 10a is not set to Invalid state (stays in the Valid state). Therefore, if a write request arrives from the host 2 to the volume (P-VOL) in the storage subsystem 10a thereafter, data is written to the P-VOL.

On the other hand, the storage subsystem 10b is in a state where operation is performed normally but the health check processing cannot be performed periodically. Therefore, in the storage subsystem 10b, the pair status of the volume (T302) and the Status of the volume (T402) are not changed. In other words, in the storage subsystem 10b, the volumes in pair relationship with the volumes in the storage subsystem 10a have their pair statuses (T302) in "Pair" and the statuses of the volume (T402) in "Valid" state.

Here, if the host 2 writes data to a certain area of the P-VOL (assuming that the address of this area (LBA) is A) after the pair state of the P-VOL has been changed (to Suspend) in the storage subsystem 10a, that data will not be mirrored in the volume (S-VOL) of the storage subsystem 10b. Thereafter, when the host 2 issues a request for reading data of the same area (address A) of the S-VOL to the storage subsystem 10b, if the storage subsystem 10b returns the data stored in the S-VOL, the data that the host 2 has written into the P-VOL will not be returned, and erroneous data will be returned.

According to the storage system 1 of the present embodiment, in that case, the process described below is performed when the read request is received so as not to have the erroneous data returned to the host 2.

Figure 24:
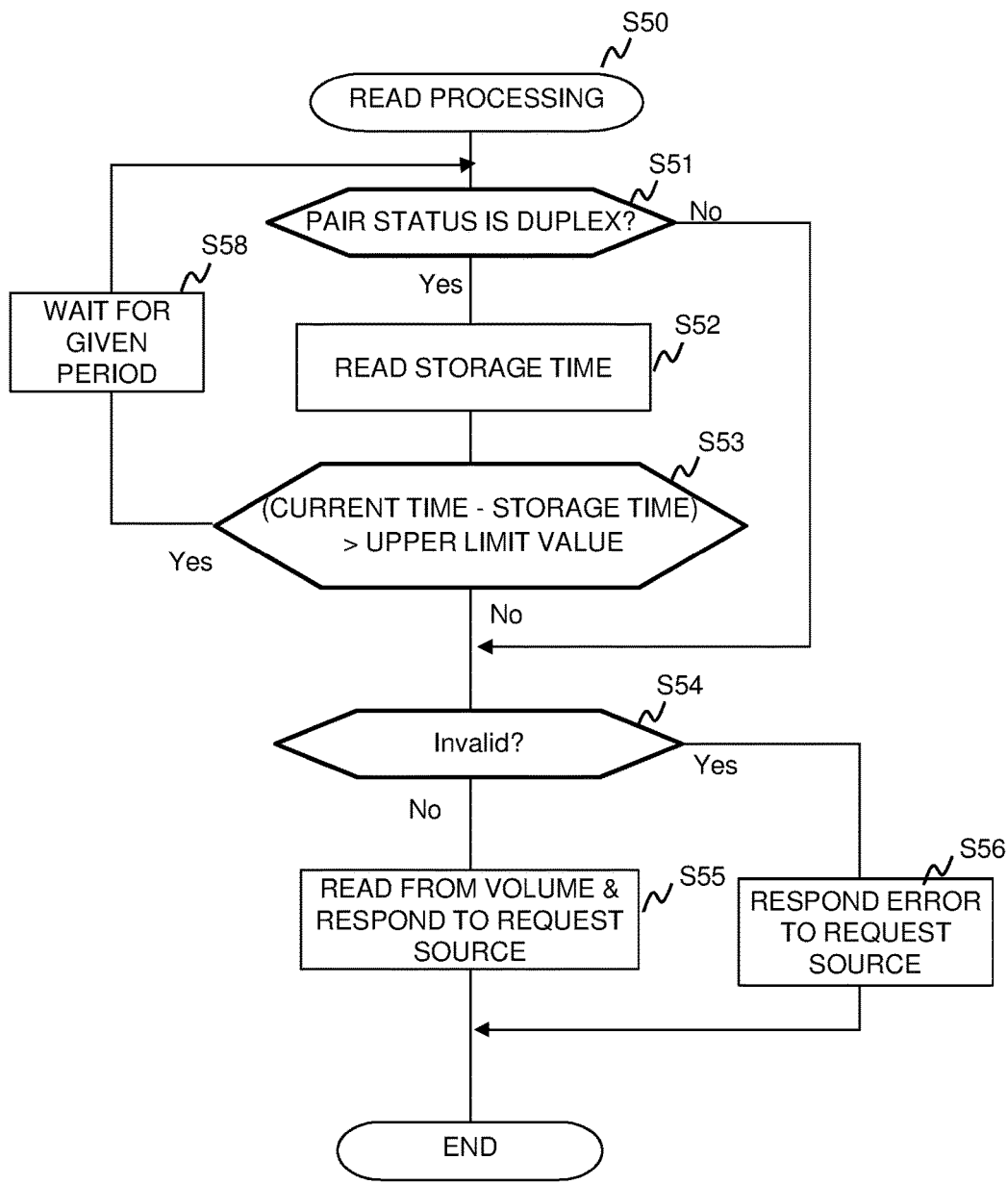
FIG. 24 is a flowchart of a read processing.

FIG. 24 illustrates a flow of the process performed when the storage subsystem 10 receives a read request regarding a logical volume (P-VOL or S-VOL). When the storage subsystem 10 receives a read request to a logical volume, at first, the MP 141 refers to the pair management information T300 to confirm whether the status of the access target logical volume is a Duplex state or not (S51). If the status of the logical volume is not a Duplex state (S51: No), the processes of S54 and thereafter are performed.

In S54, the MP 141 refers to the LDEV Status information T400, and determines whether the Status (T402) of the access target logical volume is an "Invalid" state or not. If it is an Invalid state (S54: Yes), an error is returned to a request source of the read request (such as the host 2) (S56), and the process is ended. If it is a valid state (S54: No), data is read from the access target volume, the read data and a response that the process has succeeded are returned to the read request source (such as the host 2) (S55), and the process is ended.

On the other hand, if the status of the logical volume is a Duplex state in S51 (S51: Yes), the MP 141 reads the time information stored in the Quorum storage time area 250 (hereafter, this is called "storage time") (S52). In S53, the MP 141 determines whether the difference between the current time and the storage time has exceeded a given upper limit value or not, and if a given upper limit value is not exceeded (S53: No), the processes of S54 and thereafter described earlier are performed. If the given upper limit value is exceeded (S53: Yes), the MP waits for a given period (S58), and thereafter, executes the process of S51 again. The upper limit value in S53 is, as an example, a time such as (timeout period described earlier minus 0.5 seconds).

When the storage subsystem 10 writes the health check information into the Quorum Disk by executing a health check processing and the like, it stores the time information at that time in the Quorum storage time area 250 (S106). Therefore, by having the determination of S52 and S53 performed, the MP 141 can recognize the elapsed time from when the storage subsystem 10 last performed write process to the Quorum Disk.

If the elapse time from when the storage subsystem 10 last performed write process to the Quorum Disk exceeds a certain time (the upper limit value), it may be possible that the health check processing in the storage subsystem 10 (write to the Quorum Disk) is delayed. If the health check processing is delayed, it may be possible that even though the status of the volume must be changed (such as to Invalid state), appropriate change of the volume status has not been performed due to the delay in the health check processing. Therefore, in the storage subsystem 10, the read processing is performed after waiting for the write to the Quorum Disk (S58).

The order of the processes described above is not restricted to the order described above. It is only necessary to confirm that the write to the Quorum Disk has been performed within a given period from the current time before data read from the volume is performed. Therefore, for example, the processes of S52, S53 and S58 can be executed before the process of S51 (process of confirming the pair status).

We will now return to the description of the case of (6-3). When a read request to the S-VOL in the storage subsystem 10b is received from the host 2, if the health check processing has not been performed for a given period or longer (such as the timeout period mentioned above or longer) in the storage subsystem 10b, the process described above (FIG. 24) is performed. In that case, it is determined in S53 that the current time and the storage time satisfy the following relationship:

(current time−storage time)>upper limit value so that the procedure waits for a given period (S58), and the processes are performed again from S51.

Here, we will assume a case where the health check processing (writing to the Quorum Disk) is executed in the storage subsystem 10b while the process related to the read request is standing by for a given period (S58). In that case, since the storage subsystem 10b performs the process described in (6-2), the status (Status (T402)) of the volume in the storage subsystem 10b (volume in pair relationship with the P-VOL in the storage subsystem 10a) is changed to "invalid" (and the pair status to "Suspend").

In the process related to the read request, after waiting for a given period (S58), the processes from S51 are resumed. Then, after S51, the MP 141 performs the process of S54, but since the status of the access target volume is changed to "invalid", the MP 141 returns an error to the host 2 (that is, erroneous data will not be returned to the host 2).

The description of the storage system according to the present embodiment of the present invention has been described. The present storage system according to the preferred embodiment of the present invention is composed of a first storage subsystem and a second storage subsystem each having one or more volumes, and a Quorum Disk capable of being accessed from the storage subsystem and the second storage subsystem, wherein data is duplicated between a first volume in the first storage subsystem and a second volume in the second storage subsystem. The first storage subsystem and the second storage subsystem write health check information periodically to the Quorum Disk, and periodically read the health check information written to the Quorum Disk, to thereby confirm the status of each storage subsystem.

Since each storage subsystem writes the health check information to the Quorum Disk periodically, when data transfer from the first storage subsystem to the second storage subsystem fails, the first storage subsystem confirms the health check information written by the second storage subsystem, to determine whether the second storage subsystem is in a stopped state or not, or whether the second volume is in an I/O prohibited state or not.

Especially, when data duplication is not possible between the first storage subsystem and the second storage subsystem but the second storage subsystem is not stopped (such as when the inter-DKC path has been cut off, for example), if the second storage subsystem is left as it is and not stopped, there may be fear that the host accesses erroneous data. This is because if the access from the host to the first storage subsystem is continued, and thereafter, the host switches the access path to access the second storage subsystem, the second volume only stores data that is older than the first volume. Therefore, in such case, the first storage subsystem must first stop the second storage subsystem before continuing the access from the host.

In the storage system according to the preferred embodiment of the present invention, when data transfer from the first storage subsystem to the second storage subsystem through the inter-DKC path fails, the first storage subsystem writes information that communication with the second storage subsystem through the inter-DKC path is not possible to the communication incapable bitmap in the Quorum Disk. On the other hand, the second storage subsystem detects that the first storage subsystem is not capable of communicating with the second storage subsystem through the inter-DKC path by periodically reading the Quorum Disk. In response thereto, the second storage subsystem blocks the second volume, and sets the same to a state not capable of accepting I/Os from the host. Then, it stores information that the second storage subsystem has confirmed that "the first storage subsystem has detected that it cannot communicate with the second storage subsystem", and that the second volume has been blocked (set to I/O prohibited state).

The first storage subsystem periodically checks the information in the Quorum Disk, and at the time point when it detects information stating that the second volume has been blocked, it restarts the I/O processing. Thereby, the first storage subsystem can restart processing the I/O from the host after confirming that the second volume of the second storage subsystem has been blocked, so that it can prevent the host from accessing erroneous data.

The present invention is not restricted to the above-illustrated preferred embodiments, and can include various modifications. The above-illustrated embodiments are described in detail to help understand the present invention, and the present invention is not restricted to a structure including all the components illustrated above. Further, a portion of the configuration of each embodiment can be added to, deleted from or replaced with other configurations.

A portion or whole of the above-illustrated configurations, functions, processing units, processing means and so on can be realized via hardware configuration such as by designing an integrated circuit. Further, the configurations and functions illustrated above can be realized via software by the processor interpreting and executing programs realizing the respective functions.

The information such as the programs, tables and files for realizing the respective functions can be stored in a storage device such as a memory, a hard disk or an SSD (Solid State Drive), or in a memory medium such as an IC card, an SD card or a DVD. Only the control lines and information lines considered necessary for description are illustrated in the drawings, and not necessarily all the control lines and information lines required for production are illustrated.

REFERENCE SIGNS LIST

1: Storage system
2: Host
6: SAN
10a: Storage subsystem
10b: Storage subsystem
11: Storage controller
12: Disk unit
15: Quorum Storage
111: MPB
112: FEPK
113: BEPK
114: CMPK
115: Switch (SW)
121: Drive
141: MP
142: LM
143: SM
144: CM

The invention claimed is:
1. A storage system comprising:
a first storage subsystem:
a second storage subsystem connected to the first storage subsystem via an inter-subsystem path; and a third storage subsystem connected to the first storage subsystem and the second storage subsystem: wherein
each of the first storage subsystem and the second storage subsystem has a volume, and one or more storage devices, and configured to periodically write a health check information to the third storage subsystem;
the first storage subsystem is configured, on receiving a write data to a first volume in the first storage subsystem and a write request of the write data from a host computer,
to write the write data to the first volume, and
at the same time, to issue an instruction to the second storage subsystem via the inter-subsystem path to write the write data to a second volume in the second storage subsystem;
the second storage subsystem is configured, on receiving a write data to the second volume and a write request of the write data from the host computer,
to issue an instruction to the first storage subsystem via the inter-subsystem path to write the write data to the first volume, and
at the same time, to write the write data to the second volume; and
wherein when the first storage subsystem fails to write the write data to the second volume while processing the write request received from the host computer, the first storage subsystem
reads the health check information Written in the third storage subsystem,
determines, based on the read health check information, whether the second volume is in an I/O prohibited state or not, and
resumes the processing related to the write request after determining that the second volume is in the I/O prohibited state.

2. The storage system according to claim 1, wherein
when the second storage subsystem fails to write the write data to the first volume during processing of the write request received from the host computer, the second storage subsystem
reads the health check information written in the third storage subsystem,
determines, based on the read health check information, whether the first volume is in the I/O prohibited state or not, and
resumes the processing related to the write request after determining that the first volume is in the I/O prohibited state.

3. The storage system according to claim 1, wherein
when the first storage subsystem fails to write the write data to the second volume during processing of the write request received from the host computer,
the first storage subsystem includes information stating that the first storage subsystem is in a state incapable of communicating via the inter-subsystem path in the health check information, and stores the health check information in the third storage subsystem; and
when the second storage subsystem confirms that the information stating that the first storage subsystem is in the state incapable of communicating via the inter-subsystem path is included in the health check information stored by the first storage subsystem, the second storage subsystem sets the second volume to the I/O prohibited state.

4. The storage system according to claim 3, wherein
after setting the second volume to the I/O prohibited state, the second storage subsystem includes information stating that the second volume is in the I/O prohibited state in the health check information and stores the health check information in the third storage subsystem; and
when the first storage subsystem confirms that information stating that the second volume is in the I/O prohibited state is included in the health check information stored by the second storage subsystem, the first storage subsystem resumes the processing related to the write request.

5. The storage system according to claim 1, wherein
when the first storage subsystem reads the health check information written in the third storage subsystem, the first storage subsystem determines whether the second storage subsystem has not written the health check information for a given period or longer to the third storage subsystem or not; and
if the second storage subsystem has not written the health check information to the third storage subsystem, the first storage subsystem determines that the second storage subsystem is in the stopped state.

6. The storage system according to claim 5, wherein
the first storage subsystem and the second storage subsystem are configured to store the health check information including an update generation number into the third storage subsystem, the update generation number corresponding to an update count of the health check information; and
when the update generation number written by the second storage subsystem has not been changed for a given period or longer, the first storage subsystem determines that the second storage subsystem is in the stopped state.

7. The storage system according to claim 6, wherein
the first storage subsystem records the update generation number included in the health check information written by the second storage subsystem each time when the first storage subsystem reads the health check information written to the third storage subsystem; and
when the first storage subsystem reads the health check information written in the third storage subsystem, the first storage subsystem determines whether the update generation number included in the read health check information written by the second storage subsystem is equal to the recorded update generation number or not, to determine that the update generation number written by the second storage subsystem has not been changed.

8. The storage system according to claim 7, wherein
the first storage subsystem records a point of time when the first storage subsystem first detected that the update generation number included in the health check information written by the second storage subsystem is the same as the recorded update generation number; and
when the first storage subsystem reads the health check information written in the third storage subsystem after a given period or longer has elapsed from the stored time, if the update generation number included in the read health check information written by the second storage subsystem is equal to the update generation number stored therein, the first storage subsystem determines that the update generation number written by the second storage subsystem has not been updated for the given period or longer.

9. The storage system according to claim 5, wherein
when the first storage subsystem determines that the second storage subsystem is in the stopped state, the first storage subsystem writes the health check information including information stating that the second storage subsystem is in the stopped state into the third storage subsystem;

the second storage subsystem reads the health check information from the third storage subsystem when being started, and sets the second volume to an I/O prohibited state when the second storage subsystem detects that the information stating that the second storage subsystem is in the stopped state is written in the health check information by the first storage subsystem.

10. The storage system according to claim 2, wherein after the second storage subsystem has confirmed that the first volume is in an I/O prohibited state, the second storage subsystem writes the write data to the second volume.

11. The storage system according to claim 1, wherein the first storage subsystem and the second storage subsystem store a time to write the health check information each time when the health check information is written to the third storage subsystem; and wherein when the second storage subsystem receives a read request from the host computer to the second volume, the second storage subsystem determines, based on the stored time, whether the second storage subsystem has updated the health check information within a fixed time or not, and if the health check information has not been updated within the fixed time, the second storage subsystem waits for a processing regarding the read request for a predetermined time until the health check information is updated.

12. The storage system according to claim 11, wherein if the health check information has been updated within the fixed time, data is read from the second volume and returned to the host computer.

* * * * *